United States Patent
Parellada Armela et al.

(10) Patent No.: US 10,150,604 B2
(45) Date of Patent: Dec. 11, 2018

(54) REUSABLE CLOSURE SYSTEM FOR PACKAGING

(71) Applicant: Velcro BVBA, Deinze (BE)

(72) Inventors: Luis Parellada Armela, Girona (ES);
Josep M. Soler Carbonell, Girona (ES); Enric Rodon, Barcelona (ES);
Emilio Muñoz Herrero, Barcelona (ES)

(73) Assignee: VELCRO BVBA, Deinze (BE)

( * ) Notice: Subject to any disclaimer, the term of this patent is extended or adjusted under 35 U.S.C. 154(b) by 0 days.

(21) Appl. No.: 15/310,360

(22) PCT Filed: May 11, 2015

(86) PCT No.: PCT/EP2015/060314
§ 371 (c)(1),
(2) Date: Nov. 10, 2016

(87) PCT Pub. No.: WO2015/173171
PCT Pub. Date: Nov. 19, 2015

(65) Prior Publication Data
US 2017/0247157 A1    Aug. 31, 2017

Related U.S. Application Data

(60) Provisional application No. 61/991,756, filed on May 12, 2014.

(51) Int. Cl.
*B65D 75/58* (2006.01)
*B31B 50/81* (2017.01)
(Continued)

(52) U.S. Cl.
CPC .......... *B65D 75/5838* (2013.01); *B31B 50/81* (2017.08); *B31B 70/81* (2017.08);
(Continued)

(58) Field of Classification Search
CPC .. B65D 75/5838; B65D 43/163; B65D 43/22; B65D 2575/586; B65B 11/004; B65B 61/02; B65B 61/18; B65C 1/02
(Continued)

(56) References Cited

U.S. PATENT DOCUMENTS 4,156,493 A    5/1979   Julius
4,691,373 A *  9/1987   Ausnit .................. A44B 19/34
                                             156/66

(Continued)

FOREIGN PATENT DOCUMENTS

DE    20304113 U    6/2003
EP    0307924 B1    3/1993
(Continued)

OTHER PUBLICATIONS

International Search Report and Written Opinion received for PCT/EP2015/060314. dated Aug. 6, 2015. 11 pages.
(Continued)

*Primary Examiner* — Jes F Pascua
(74) *Attorney, Agent, or Firm* — Finch & Maloney PLLC

(57) ABSTRACT

A reusable closure system is disclosed for flexible packaging applications. The system generally includes base and lid portions. The base portion can be bonded to underlying package material and includes first and second fields of touch fasteners separated by a multi-layer buffer zone. The buffer zone can be at least in part co-located with a frangible region of underlying package material. In some embodiments, the buffer zone is substantially free of active bonding agent, such that there is little or no active bonding agent overlapping the frangible region. One of the touch fastener fields of the base can be deployed at least partially within the area defined by the frangible region. The other touch fastener field is deployed around the buffer zone. The lid
(Continued)

portion can be bonded to the package material and/or base portion, and includes a hinge and another touch fastener field to mate with the base fields.

25 Claims, 16 Drawing Sheets

(51) Int. Cl.
| | | |
|---|---|---|
| *B31B 70/81* | (2017.01) | |
| *B65B 11/00* | (2006.01) | |
| *B65B 61/02* | (2006.01) | |
| *B65B 61/18* | (2006.01) | |
| *B65C 1/02* | (2006.01) | |
| *B65D 43/16* | (2006.01) | |
| *B65D 43/22* | (2006.01) | |
| *B31B 160/10* | (2017.01) | |

(52) U.S. Cl.
CPC .......... *B65B 11/004* (2013.01); *B65B 61/02* (2013.01); *B65B 61/18* (2013.01); *B65C 1/02* (2013.01); *B65D 43/163* (2013.01); *B65D 43/22* (2013.01); *B31B 2160/10* (2017.08); *B65D 2313/02* (2013.01); *B65D 2575/586* (2013.01); *Y02W 30/807* (2015.05)

(58) Field of Classification Search
USPC ................. 383/203–205, 207–211, 66, 80
See application file for complete search history.

(56) References Cited

U.S. PATENT DOCUMENTS

| | | | |
|---|---|---|---|
| 4,794,028 A | 12/1988 | Fischer | |
| 4,824,261 A | 4/1989 | Provost | |
| 4,848,575 A | 7/1989 | Nakamura et al. | |
| 4,887,338 A * | 12/1989 | Handler | A44B 18/00 24/306 |
| 4,946,289 A | 8/1990 | Bolling et al. | |
| 5,260,015 A | 11/1993 | Kennedy et al. | |
| 5,362,299 A | 11/1994 | Schou | |
| 5,436,051 A | 7/1995 | Donaruma et al. | |
| 5,595,786 A | 1/1997 | McBride, Jr. et al. | |
| 5,687,875 A | 11/1997 | Watts et al. | |
| 5,725,311 A | 3/1998 | Ponsi et al. | |
| 5,964,399 A * | 10/1999 | Ruben | B65D 5/54 206/813 |
| 6,026,953 A | 2/2000 | Nakamura et al. | |
| 6,065,591 A | 5/2000 | Dill et al. | |
| 6,113,271 A | 9/2000 | Scott et al. | |
| D447,054 S | 8/2001 | Hill | |
| 6,420,006 B1 | 6/2002 | Scott | |
| 6,428,867 B1 | 8/2002 | Scott et al. | |
| 6,589,622 B1 | 7/2003 | Scott | |
| 6,671,935 B2 | 1/2004 | Filion et al. | |
| 6,687,962 B2 | 2/2004 | Clarner et al. | |
| 6,737,147 B2 | 5/2004 | Kennedy et al. | |
| 6,783,834 B2 | 8/2004 | Shepard et al. | |
| RE38,652 E | 11/2004 | Provost | |
| 6,834,773 B2 | 12/2004 | Wu | |
| 6,991,375 B2 | 1/2006 | Clune et al. | |
| 6,991,843 B2 | 1/2006 | Armela et al. | |
| 6,996,880 B2 | 2/2006 | Kurtz, Jr. et al. | |
| 7,048,818 B2 | 5/2006 | Krantz et al. | |
| 7,344,744 B2 | 3/2008 | Sierra-Gomez et al. | |
| 7,530,472 B2 | 5/2009 | Bitowft et al. | |
| 8,033,421 B2 | 10/2011 | Cowell et al. | |
| 8,051,540 B2 | 11/2011 | Gallant et al. | |
| 8,182,891 B2 | 5/2012 | Scott et al. | |
| 8,225,467 B2 | 7/2012 | Gallant et al. | |
| 8,448,305 B2 | 5/2013 | Gallant et al. | |
| 8,545,740 B2 | 10/2013 | Gallant et al. | |
| 8,549,714 B1 | 10/2013 | Shepard et al. | |
| 8,663,409 B2 | 3/2014 | Mueller | |
| 8,685,194 B2 | 4/2014 | Grady | |
| 8,898,869 B2 | 12/2014 | Idrizovic et al. | |
| 9,394,085 B2 * | 7/2016 | Nakano | B65D 75/5838 |
| 9,475,615 B2 * | 10/2016 | Schiermeier | B65D 33/1691 |
| 2001/0038016 A1 | 11/2001 | Russo | |
| 2005/0011906 A1 | 1/2005 | Buck et al. | |
| 2005/0117819 A1 * | 6/2005 | Kingsford | B65D 5/0236 383/203 |
| 2006/0283750 A1 | 12/2006 | Villars et al. | |
| 2008/0116217 A1 | 5/2008 | Klein et al. | |
| 2009/0014459 A1 | 1/2009 | Hood et al. | |
| 2009/0090736 A1 | 4/2009 | Cowell et al. | |
| 2010/0001016 A1 | 1/2010 | Savage | |
| 2010/0108706 A1 | 5/2010 | Oman | |
| 2011/0147401 A1 | 6/2011 | Rubo et al. | |
| 2013/0032608 A1 | 2/2013 | Hood et al. | |
| 2013/0239371 A1 | 9/2013 | Shepard et al. | |
| 2013/0280474 A1 | 10/2013 | Medina et al. | |
| 2013/0318752 A1 | 12/2013 | Kheil et al. | |
| 2015/0239619 A1 * | 8/2015 | Daffner | B65D 75/5833 383/211 |
| 2016/0176572 A1 * | 6/2016 | Rodon | A47K 10/32 206/494 |
| 2017/0021974 A1 * | 1/2017 | Lemmons | B65D 33/1691 |

FOREIGN PATENT DOCUMENTS

| | | | |
|---|---|---|---|
| EP | 1090852 A1 | 4/2001 | |
| JP | 2012035897 A * | 2/2012 | |
| WO | 8702646 | 5/1987 | |
| WO | 9530599 | 11/1995 | |
| WO | WO 2013/100098 A1 * | 7/2013 | |
| WO | 2015173171 A1 | 11/2015 | |
| WO | 2016096378 A1 | 6/2016 | |

OTHER PUBLICATIONS

International Preliminary Report on Patentability received for PCT/EP2015/060314. dated Nov. 15, 2016. 7 pages.
"Guide to Flow Wrapping," BOSCH Packaging Technology. Copyright 2011. 30 pages.
"Interlocking Hook-To-Hook Closure System Ideal for Packaging," Press-Lok Velcro brand. Copyright 2011. 4 pages.
"Molded Hook Fasteners Offering a Range of Performance Characteristics" High Technology Hook brochure, Velcro Brand. Copyright 2011. 2 pages.
International Search Report and Written Opinion received for PCT Application No. PCT/EP2015/077968, dated Mar. 18, 2016. 11 pages.
International Preliminary Report on Patentability received for PCT Application No. PCT/EP2015/077968. dated Jun. 20, 2017. 6 pages.

* cited by examiner

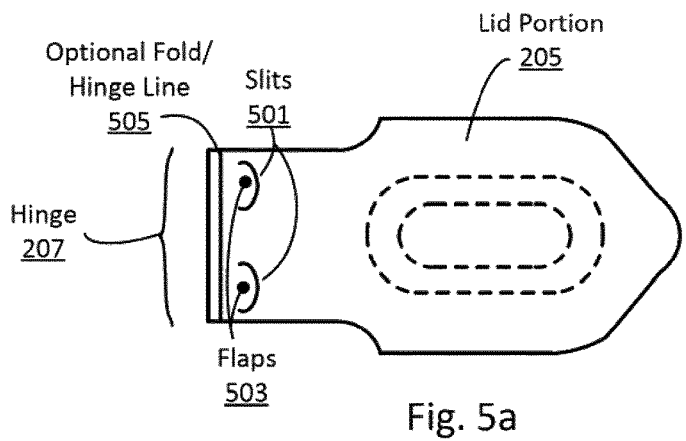
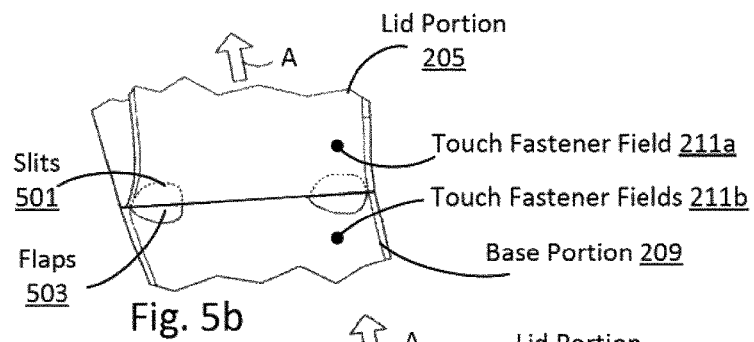
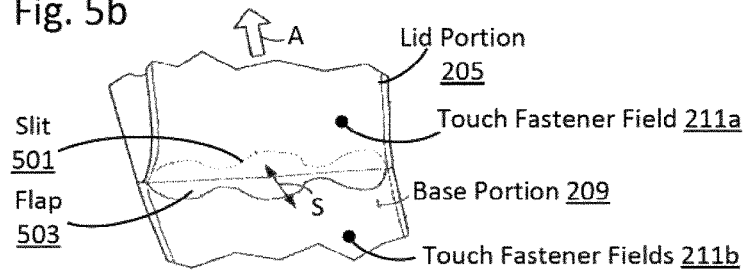

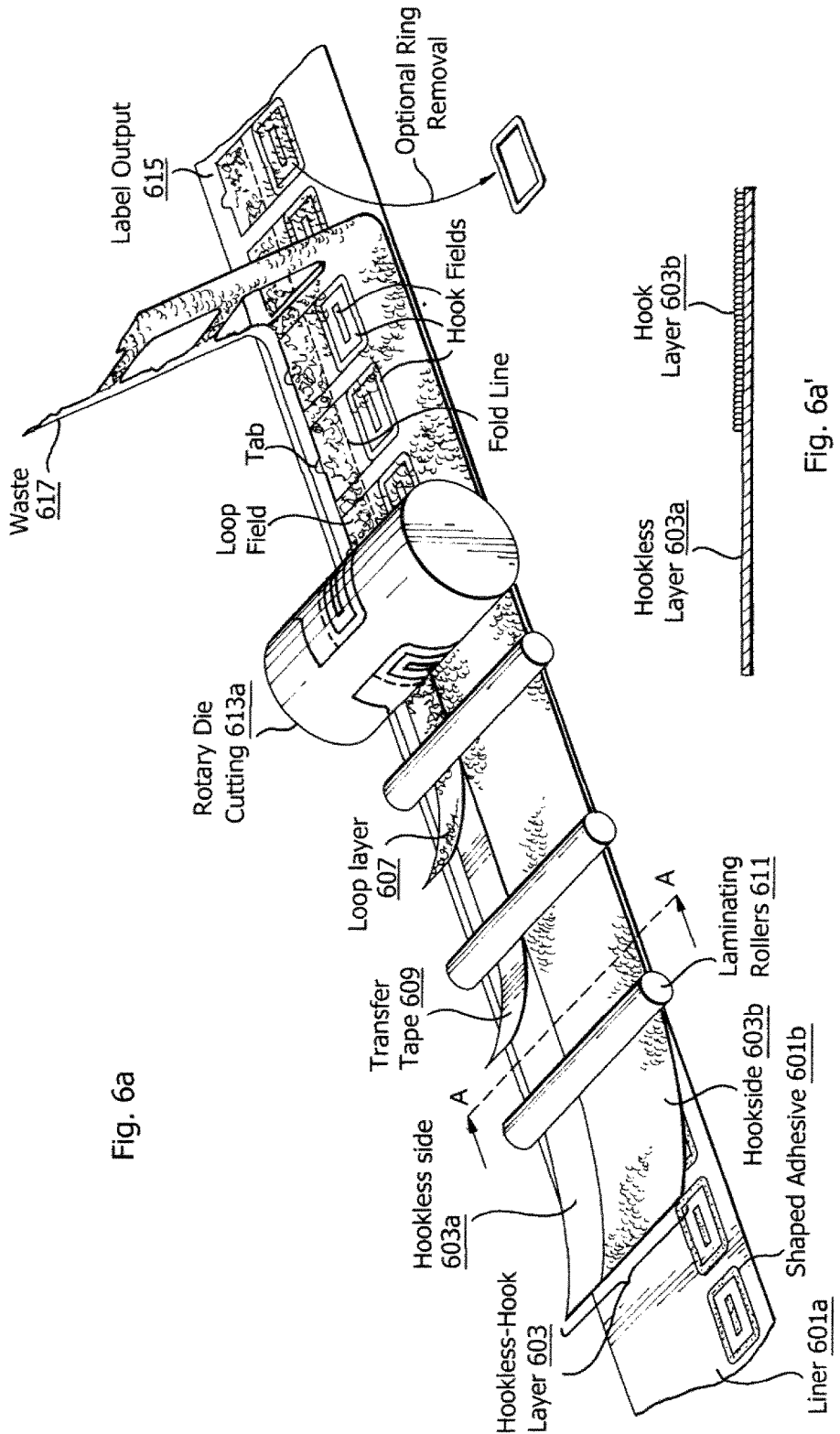

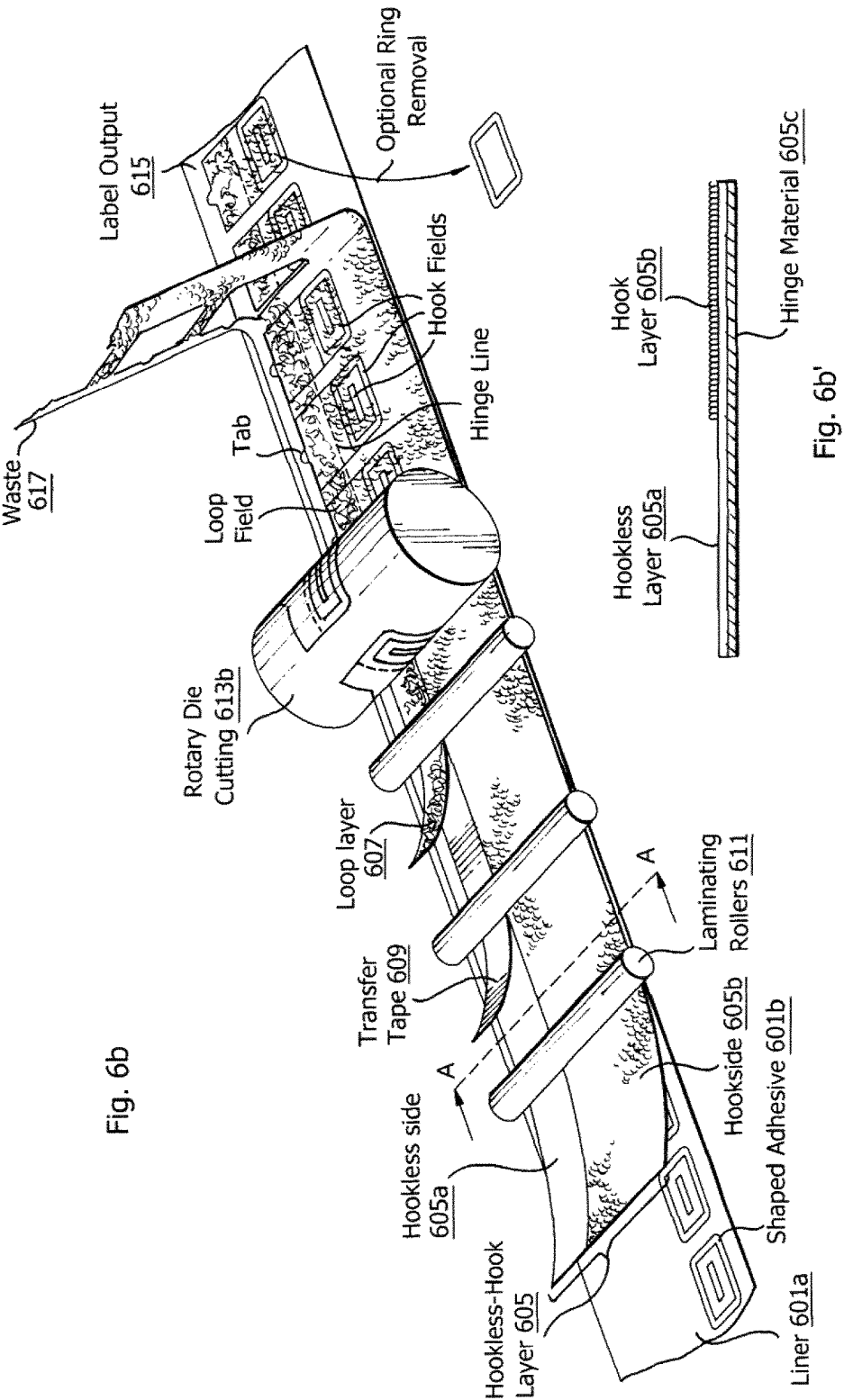

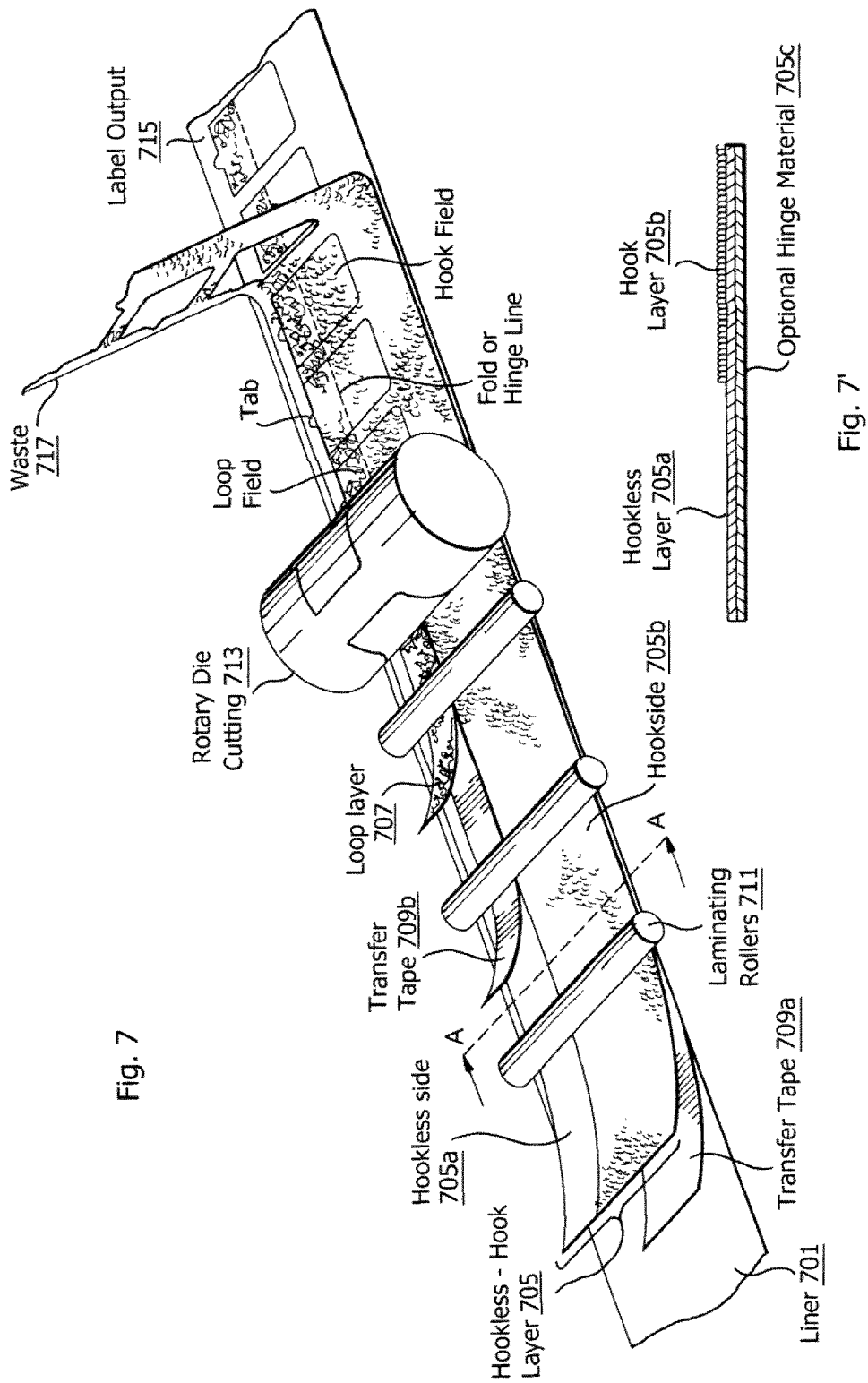

REUSABLE CLOSURE SYSTEM FOR PACKAGING

RELATED APPLICATION

This application claims the benefit of and priority to U.S. Provisional Application No. 61/991,756, filed on May 12, 2014, which is herein incorporated by reference in its entirety.

BACKGROUND

Oftentimes a given consumable product is packaged within a container, and can be accessed by opening a reusable closure of the container. Once the consumer is done accessing the product, the closure can be closed so as to allow the unused portion of product within the container to remain usable at a later time. Example products that are commonly so packaged are moistened towelettes so so-called wet wipes. The towelettes may be, for example, treated with gentle cleaning agent, antibacterial, or medicament designed or otherwise suitable for contact with human skin. In early such packaging designs, the container was typically a rigid plastic container configured with a similarly rigid hinged lid. In more recent years, the advent of so-called flow-pack or flow-wrapping packaging techniques have allowed such product containers to be formed with a bag-like container made of flexible material such as polyester or polypropylene combined with a sealant layer of low density polyethylene (LDPE). In some such cases, the closure is a molded rigid plastic assembly that is adhered to the bag, the closure generally including a hinged lid that can be raised to provide access to an underlying hole in the bag, and lowered to a closed position. In other such cases, the closure is a flexible plastic lid-like flap that is adhered to the bag and over the underlying hole via an adhesive. The flap can be peeled open to access product within the bag and pressed back down on the bag to a closed position.

BRIEF DESCRIPTION OF THE DRAWINGS

FIGS. 5a-5c each illustrates a hinging technique that can be used by a reusable package closure system configured in accordance with another embodiment of the present disclosure.

FIGS. 6a and 6b each illustrates a process for making a reusable package closure system, in accordance with an embodiment of the present disclosure. FIGS. 6a' and 6b' each shows a cross-section A-A of the reusable package closure system of FIGS. 6a and 6b, respectively.

FIG. 7 illustrates a process for making a reusable package closure system, in accordance with another embodiment of the present disclosure. FIG. 7' shows a cross-section A-A of the reusable package closure system of FIG. 7.

Figure 1A:
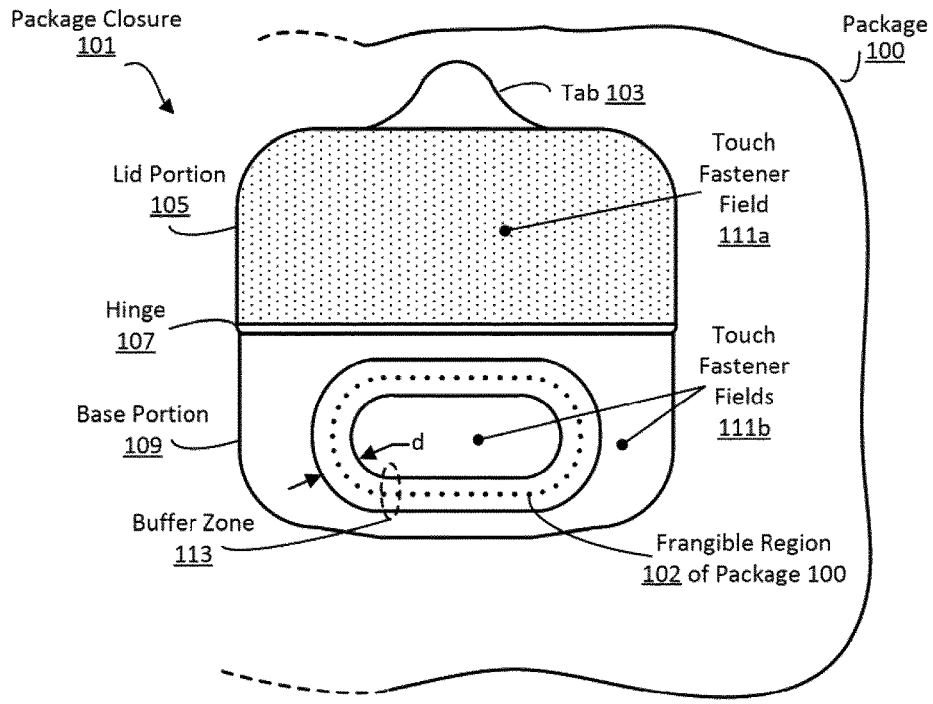
FIGS. 1a-1r each illustrates one or more example features of a reusable package closure system configured in accordance with an embodiment of the present disclosure.
Figure 1A:
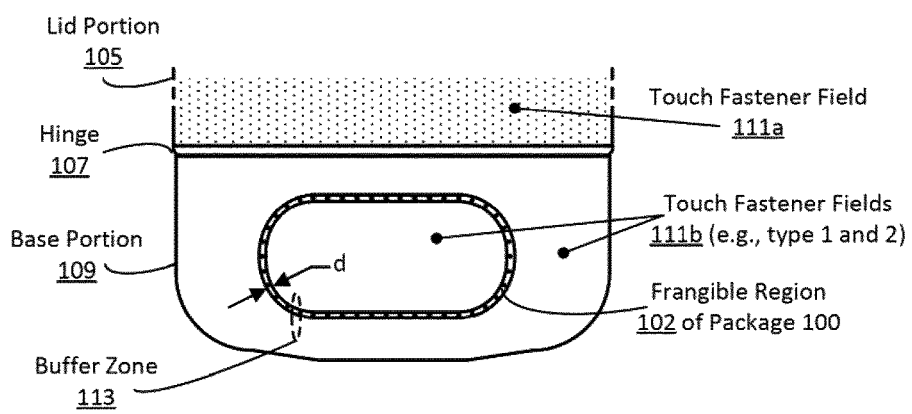

As will be appreciated, the figures are not necessarily drawn to scale or intended to limit the described embodiments to the specific configurations shown.

DETAILED DESCRIPTION

A reusable closure system is disclosed for packaging applications. The closure system generally includes base and lid portions. The base portion is configured to adhere to or otherwise be bonded to package material and generally includes first and second fields of touch fasteners separated by a continuous multi-layer buffer zone, in accordance with an embodiment. Once the closure system is deployed on packaging material, the buffer zone can be at least in part co-located with a frangible region of underlying package material. In some embodiments, the buffer zone is substantially free of active adhesive (or other bonding agent, such as a weld), such that there is little or no active bonding agent overlapping the frangible region. One of the touch fastener fields of the base is deployed generally within the area defined or otherwise bounded by the frangible region of underlying package material, although this field may straddle or extend into the frangible region as well. The other touch fastener field is deployed around the buffer zone, and partially or even completely surrounds the buffer zone in some embodiments. An edge of the lid portion can be bonded (e.g., adhesive or weld) to at least one of the underlying package material and the base portion in a hinge-like fashion, and includes another touch fastener field (or many such fields). The hinge allows the lid to be selectively moved between closed and opened positions so that product within the package can be accessed as desired. In some embodiments, the touch fastener fields may be configured to provide localized peel strength to facilitate removal of the frangible region (e.g., higher peel strength over the area bounded by frangible region, relative to peel strength elsewhere). One specific embodiment provides a combination of localized peel strength and a buffer zone substantially free of active bonding agent. Other closure system features will be apparent in light of this disclosure, such as a stay-open lid mechanism and an anti-peel mechanism to prevent or otherwise inhibit complete removal of the lid. Various techniques are also disclosed for making the package closure systems described herein, as well as product packaging techniques that utilize the closure systems. Note the closure system can be provided separately from any packaging. For instance, in one embodiment, a plurality of the closure systems can be provided in a dispensable roll that can be used to feed a flow-wrap packaging process.

For purposes of clarity, reference herein to a "frangible region" generally refers to the area that is manipulated or otherwise weakened so as to make the area bounded by the frangible region relatively easier to separate or otherwise remove so as to effectively make that area sacrificial. Frangibility can be brought about in a given material by any number of treatments that tend to diminish the ability of that material to stay intact when confronted with pulling forces (and/or pushing forces, as the case may be). Frangibility can be brought about in a material by, for example, perforating, thinning, heating, pressing, chemical treatment, and/or any other suitable processes whether they be physical or chemical in nature (or both). While the initial separation of the frangible area may require a greater force, the subsequent separation of the remaining frangible area may require a relatively lesser force given the nature of the separation forces at hand.

In addition, reference herein to a buffer zone that is "substantially free" of active bonding agent generally refers to an area that is at least in part co-located with the frangible region of the package material, such that there is no or little active bonding agent overlapping the frangible region. For instance, and in accordance with one example embodiment, a given buffer zone is substantially free of bonding agent if 70% or more of the total area of the frangible region has no adhesive or weld or other bonding agent thereon, thereby allowing 70% or more of the frangible region to be readily separated from the remaining package material without being impeded by bonding agent. In still other embodiments, this area of frangible region that is free of bonding agent may be higher, such as in the example case where 75% or more of the frangible region area is free of bonding agent, or 80% or more, or 85% or more, and so on, up to 100% of the frangible region being free of bonding agent. In some embodiments, note that the amount of allowable frangible region bonding agent located at the initial separation area (initial tear of the frangible region) can be less than the amount of allowable frangible region bonding agent at other separation points along the remainder of the frangible region (continued tear to remove remainder of the frangible region). For instance, in one embodiment, the initial separation area of the frangible region may have a bonding agent threshold of 20% or less (i.e., 80% or more of that initial frangible region is bonding agent free), while the subsequent separation area of the remaining frangible region may have a bonding agent threshold of 30% or less (i.e., 70% or more of that remaining frangible region is bonding agent free). Other variations will be apparent in light of this disclosure.

General Overview

As previously explained, typical flexible package closures are implemented as a molded rigid plastic assembly or a flexible plastic lid-like flap that is adhered to the package material and over an underlying hole via an adhesive. There are a number of non-trivial issues associated with such typical closures. For instance, while molded rigid plastic closures are robust, they tend to not provide a sufficient seal when in the closed position thereby giving rise to potential that the product within the package will be dried out or otherwise not properly stored. A closure having the flexible plastic lid-like flap may generally address such concerns at least initially, but tends to lose its capability to securely adhere to the underlying packaging after numerous open-close cycles. Furthermore, the hole in the packaging that provides access to the product is typically perforated and completely covered with the adhesive underlying the plastic flap. When the consumer lifts the flap of the packaging for the first time, the flap adhesive is intended to pull and remove the perforated portion of the packaging to which it is adhesively bonded. While such a configuration may generally work for its intended purpose, note that the adhesive straddles the perforation line and therefore tends to equally pull on the entire surface of the underlying packaging material, which can result in failure to successfully remove the perforated section without user intervention.

Thus, and in accordance with an embodiment of the present disclosure, a reusable closure system is disclosed for packaging applications. The closure system generally includes a base portion and a lid portion. In an embodiment, the base portion can be bonded to package material and includes first and second fields of touch fasteners separated by a multi-layer buffer zone. A first of the base touch fastener fields can be deployed within the area defined by the frangible region of the underlying package material, although this field may straddle or extend into the frangible region, as will be appreciated in light of this disclosure. Further note that, in other embodiments, the frangible region can be formed after placement of the base, as will be explained herein. The other touch fastener field can be deployed around the buffer zone, and at least partially or even completely surrounds the buffer zone, in accordance with some example embodiments. An edge of the lid portion can be bonded to at least one of the underlying package material and the base portion in a hinge-like fashion, and includes another touch fastener field that operates in conjunction with the touch fastener fields of the base portion. The hinge allows the lid to be moved from a closed position to an open position when product access is desired and further allows the lid to be moved from an open position to a closed position when product access is no longer desired. The base and lid portions can be bonded, for example, via adhesive, an ultrasonic weld, thermal bond, or any other suitable bonding technique that will securely fasten the respective portions.

The multi-layer buffer zone, which generally includes or otherwise passes through a touch fastener layer and an underlying bonding layer (e.g., adhesive layer, weld interface, thermal bond interface), can be at least in part co-located with a frangible region of the underlying package material. In some embodiments, the buffer zone is substantially free of active adhesive, such that there is no or little active adhesive overlapping the frangible region. In some such cases, adhesive that was initially provisioned in the buffer zone can be subsequently deactivated (e.g., via a varnish or lacquer treatment), thereby rendering that adhesive effectively inactive. Thus, while deactivated adhesive may still be physically present in the buffer zone, it will provide no or otherwise negligible adhesion quality. In other such cases, the adhesive can be selectively provisioned (via a printing or other selective deposition process) so that no adhesive is provided in the buffer zone, thereby providing an adhesive-free zone. In other such cases, adhesive that was initially provisioned in the buffer zone can be subsequently physically removed (e.g., via a cutting process that effectively defines the buffer zone), thereby providing an adhesive-free zone.

The hinge may be implemented, for example, with a fold line, such as a thinned portion of the closure where the lid is joined to or otherwise integrally formed with the base portion. Alternatively, the hinge and lid can be integral with one another but exist separately from the base portion. In still other embodiments, each of the hinge, lid, and base can be implemented with separate layers or components that operatively engage to provide a hinging action. In some embodiments, the hinge may be biased or otherwise configured to stay in a desired open position when the lid touch fasteners are not engaged with the base touch fasteners. Numerous suitable hinging arrangements will be apparent in light of this disclosure.

In some cases, upon first opening of the closure, the base touch fastener field (or fields) within the area defined by frangible region of the package material engages with a touch fastener field (or fields) of the lid such that when the lid is lifted to the open position it causes the frangible region to be separated from the remainder of the package thereby providing an access port to product within the package. The portion of the package material liberated by virtue of the frangible region may then remain attached to the lid touch fastener field(s). Note that thickness provided by the now joined touch fastener field and the liberated portion of the package material effectively forms a plug which can subsequently be helpful in ensuring a good seal in the access port of the package when the closure is put back in the closed position. In some embodiments, the peel strength of the touch fastener field(s) within the sacrificial area defined by the frangible region is greater than the peel strength of the touch fastener field(s) deployed around the buffer zone, so as to facilitate removal of that sacrificial area. In such cases, note that even if there is adhesive straddling or extending into the frangible region, the enhanced or localized peel strength can be used to successfully remove the sacrificial area of the package without user intervention. In still other embodiments, a combination of localized peel strength and a buffer zone substantially free of active adhesive is provided, so as to further facilitate relatively easy and automatic removal of the sacrificial area.

The touch fastener fields may be implemented, for example, with any suitable combination of touch fasteners. For instance, the lid touch fastener field (or fields, as the case may be) may be configured with loop material and the base touch fastener fields can be implemented with hook material. Alternatively, the lid touch fastener field(s) may be configured with hook material and the base touch fastener fields can be implemented with loop material. Alternatively, both the lid and the base touch fastener fields can be configured with hook material. Alternatively, one or both of the lid and the base may include a combination of both hook and loop fields. In any such cases, the peel strength of the fields involved in removal of the sacrificial area within the frangible region can be relatively higher than other peel strengths provisioned for the closure system. The higher peel strength can be implemented, for example, by providing a denser field of fasteners within the area defined by the frangible region, although any suitable technique for increasing peel strength can be used.

In some embodiments, the closure system can be formed using a label making process where the resulting roll of closures (or so-called labels) can then be used as a feed to a flow-wrap packaging process. The closures may be completely or partially formed, and the subsequent flow-wrap process can be adjusted accordingly. The form factor of the closure can have any number of shapes and the present disclosure is not intended to be limited to any particular one or set of shapes.

As noted, the closure system can be deployed on or otherwise integrated with packaging material using, for example, a label-based flow-pack or flow-wrapping process, wherein the closure system is disposed onto the packaging material as a semi-flexible or semi-rigid label. In some embodiments, the label-based closure system is fully formed when transferred to the packaging material during the flow-wrap process. In other embodiments, the label-based closure system can be transferred to the packaging material in a partially formed state. For instance, in one such embodiment, the label-based closure system is transferred to the packaging material fully formed except for the buffer zone. In such cases, note that the frangible region and the buffer zone can be formed simultaneously at some point after the label dispensing stage of the process, although in other embodiments they can be formed separately (in either case, note the lack of need for registration to align a pre-cut frangible region with a label-based closure). This simultaneous forming can be done, for example, using a rotary die cutter or other suitable cutting mechanism (e.g., flatbed die cutting system, laser cutting) configured to cut through the top touch fastener material and adhesive layers but only weaken or perforate the underlying package material. In such cases, the buffer zone is effectively a line cut that is co-located with the frangible region. As will be appreciated, however, the buffer zone may have a greater thickness in other embodiments. Numerous forming and deployment methods will be apparent in light of this disclosure.

Closure Structure

FIG. 1a illustrates a reusable package closure system configured in accordance with an embodiment of the present disclosure. As can be seen, the closure 101 is shown in an open position and deployed on a flexible bag-like package 100. The product within the package can be any product, but in one example case is an interleaved stack of wet wipes. Numerous other suitable products will be apparent. The package 100 can be implemented with any suitable package materials, such as polyester or polypropylene (e.g., 48 to 60 gauge, either gloss or matt) combined with a sealant layer of low density polyethylene. Other example embodiments may have package 100 implemented with bags of high density polyethylene and polypropylene (chalk based). In a more general sense, package 100 can be any flexible material or combined/laminated materials such as polyethylene, polypropylene, polyester (e.g., polyethylene terephthalate or so-called PET), or any other suitable flexible packaging material. In alternative embodiments, note that the package 100 can be a rigid or semi-rigid package (such as those produced by Tetra Pak Inc.), if so desired. As will be further appreciated, details such as the shape, color, degree of transparency (if any), and aesthetic design (if any) of the package 100 can be adjusted as desired.

As can be further seen, the closure 101 generally includes a lid portion 105 and a base portion 109. The base and lid portions of this example embodiment are operatively coupled to one another by a hinge 107. The lid portion 105 includes a tab 103 configured to assist in opening and closing operations. The tab 103 may be textured to provide a desirable tactile sensation and gripability. The lid portion 105 further includes a touch fastener field 111a, which in this example embodiment effectively covers the entire surface of the lid. In other embodiments, note that the touch fastener field 111a may be deployed in one or more patterns or otherwise more selectively than shown, while still substantially maintaining the same function as provided herein.

The base portion 109 includes first and second touch fastener fields 111b, which in this example embodiment collectively cover the entire surface of the base, except for the buffer zone 113 separating the two fields 111b. Just as with field(s) 111a, the touch fastener fields 111b may alternatively be deployed in one or more patterns or otherwise more selectively than shown, while still substantially maintaining the same function as provided herein. As can be further seen, the base portion 109 is located on the package 100 such that a frangible region 102 of package 100 is located within the buffer zone 113 (as shown with a perforated line). Although the frangible region 102 is depicted as being centrally located between the first and second touch fastener fields 111b, it may meander from one edge to the other or otherwise follow an irregular and/or off-center path within the buffer zone 113, in some embodiments. Further note that the buffer zone 113 has a thickness d, which in this example embodiment is relatively wide (e.g., 2 to 10 mm). In other embodiments, the thickness d of buffer zone 113 may be narrower or even a line cut (resulting from a die cut or other cutting action), such as in the case of the example shown in FIG. 1a'. As will be appreciated in light of this disclosure, note that the thicker the buffer zone 113, the greater the tolerance afforded in the placement of the closure 101 on a package 100 having a pre-cut frangible region 102. In other words, the greater the thickness d of the buffer zone 113, the easier it is to co-locate that zone 113 with a pre-cut frangible region 102 during placement of the closure 101 on the package 100. Thus, the packaging process is relatively easier.

The touch fastener fields 111a and 111b can be implemented with any suitable combination of fastening elements, including but not limited to woven, non-woven, knit, and molded elements. For instance, the lid touch fastener field(s) 111a may be configured with loop material and the base touch fastener fields 111b can be implemented with hook material, such as shown in the example embodiment of FIG. 1h. Alternatively, the lid touch fastener field(s) 111a may be configured with hook material and the base touch fastener fields 111b can be implemented with loop material, such as shown in the example embodiment of FIG. 1i. Alternatively, both the lid and the base touch fastener fields 111a and 111b can be configured with hook material, such as shown in the example embodiments of FIG. 1j. FIG. 1k shows further details of one specific example configuration that can be used in a hook-to-hook application, and FIG. 1l shows another specific example configuration that can be used in a hook-to-hook (or head-to head, as the case may be) application. The fastener elements within a given field may generally include a stem and head configuration. The head-shape can vary from one embodiment to the next (e.g., disc-shaped, mushroom-shaped, hook-shaped) depending on factors such as desired peel and sheer strengths. U.S. Pat. Nos. 6,687,962, 8,225,467, 8,448,305, and 8,685,194, as well as U.S. Patent Publication Nos. 2013/0239371, 2013/0280474, and 2013/0318752 all disclose further details of example fastener element configurations that can be used as well as forming methods. Each of these applications is herein incorporated by reference in its entirety. The hook and loop materials (or hook and hook materials, as the case may be) may have any number of configurations, such as any of those produced by Velcro USA Inc. or any other brand of hook and loop materials.

In any such cases, note that the peel strength of the field 111b (or fields 111b, as the case may be) anchored within the area defined by the frangible region 102 can be relatively higher than other peel strengths provisioned outside of the frangible region 102, in accordance with an embodiment. In the context of a touch fastener such as hook and loop or hook and hook configurations, peel strength generally refers to the resistance to stripping of one component from the other when a force normal to the mating surfaces is applied to the extremity of one of the components. Such peeling force on the component causes it to flex and progressively peel from the other. It is desirable to have peel strength that ensures that the closure does not release under normal forces of use for a given application but still permits the components to be separated when desired. The higher peel strength can be implemented, for example, by providing a denser field of fastener elements within the area defined by the frangible region, modifying the geometry of the hook elements (e.g., providing mushroom or disk shaped heads to engage a loop or mesh material), providing texture on the elements (e.g., dimpled or otherwise rough surface). In another example embodiment, the hook/loop area outside of the frangible region 102 can be treated (e.g., flattened out, cleaned, or eroded by means of heat or pressure or milling) to create a lower (softer) peel. Other mechanisms for providing varying degrees of peel strength will be apparent in light of this disclosure.

The lid portion 105 and base portion 109 can be integrally formed together, or formed separately and then operatively coupled with one another. Each portion can be configured with a desired look and feel as well as a desired rigidity. In some embodiments, the lid portion 105 and base portion 109 are integrally formed by way of extrusion and laminating processes. In some cases, each of the lid portion 105 and base portion 109 are flexible, but more rigid than the package 100 material. The material from which the lid portion 105 and base portion 109 are made can be, for example, the same as the material from which the package 100 is made. However, note that the lid portion 105 and base portion 109 can be made thicker so as to provide a greater degree of rigidity while still maintaining a degree of flexibility. In addition, note that stiffening agents, coatings, or other treatments can be used to provide a desired degree of rigidity. In a more general sense, the lid portion 105 and base portion 109 can be made with any suitable materials using any suitable processes. In some embodiments, it may be desirable to have a transparent or semi-transparent lid 105, and the materials and forming process can be adjusted accordingly.

In one specific embodiment, the lid touch fastener field 111a is implemented with VELCRO® brand Velour-3905 loop material and the base touch fastener fields 111b are implemented with VELCRO® brand UM-830 hook material. In another specific embodiment, the lid touch fastener field 111a is implemented with VELCRO® brand Velour-3969 loop material and the base touch fastener fields 111b are implemented with VELCRO® brand UM-847 hook material. In another specific embodiment, the lid touch fastener field 111a is implemented with a brush loop material of roughly 50 gsm and the base touch fastener field 111b within the area defined by the frangible region 102 is implemented with VELCRO® brand UM-847 and the base touch fastener field 111b outside the frangible region 102 is implemented with VELCRO® brand UM-830. In another such case, the base touch fastener field 111b within the area defined by the frangible region 102 is implemented with VELCRO® brand UM-847 having a first density of hook elements and the base touch fastener field 111b outside the frangible region 102 is implemented with VELCRO® brand UM-847 having a second density of hook elements. Such configurations can provide a different peel strength within the area defined by the frangible region 102, relative to the peel strength outside that area. Other embodiments may include similar fastener material systems, but with those fastener material systems oppositely deployed on the lid and base portions 105 and 109. Any suitable touch fastener configurations can be used.

Figure 1B:
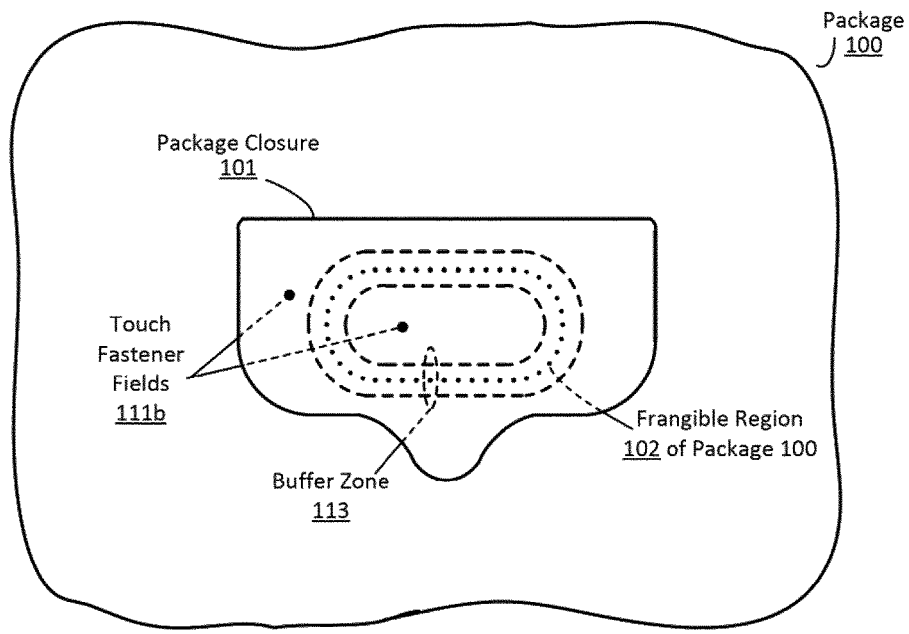
Figure 1C:
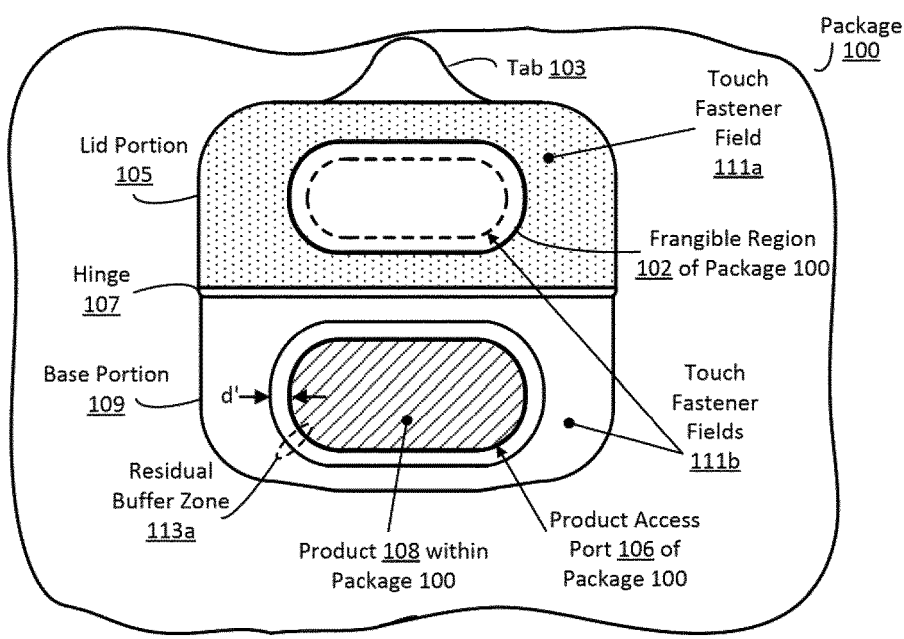

FIG. 1b shows the closure 101 of FIG. 1a in the closed position, with some of the now hidden details depicted with dashed lines, including the frangible region 102, the touch fastener fields 111b, and the buffer zone 113. FIG. 1c shows the closure 101 of FIGS. 1a and 1b in the opened position. As can be seen, the product 108 within the interior volume of package 100 is now exposed, because the area within the frangible region 102 has been completely removed by operation of the user-provided lid-lift force in conjunction with lid touch fastener field 111a and the base touch fastener field 111b within the area defined by the frangible region 102. Note that the area within the frangible region 102 is now effectively part of a plug that further includes the corresponding touch fastener field 111b. This plug will help seal the product access port 106 when the lid 105 is closed again. Further note that there may be some residual buffer zone 113a left in place on the package 100, but this need not be the case. Rather, in other embodiments, there may be no residual buffer zone 113a or an irregular pattern or portion of residual buffer zone 113a remaining on the package 100. In this example case, the amount of residual buffer zone 113a has a relatively consistent thickness of d', something smaller than the original thickness d.

FIGS. 1d-1g each show a cross-section of an example closure 101 configured in accordance with an embodiment of the present disclosure. As can be seen, each embodiment includes a multi-layer buffer zone 113 that generally includes or otherwise passes through a base touch fastener field 111b and bonding agent 115, which is used to secure the closure 101 to the underlying package 100. In some example embodiments, the bonding agent 115 is implemented with adhesive. However, other embodiments may include any alternative bonding agents such as those resulting from an ultrasonic weld or heat application or any other suitable bonding process (e.g., vulcanization or other chemical bonding) or a combination of bonding agents (e.g., adhesive+weld). In a more general sense, the disclosure herein equally applies to any suitable bonding schemes, where bonding agent 115 includes a bonding interface layer resulting from material deposition (e.g., adhesive), physical-based surface manipulation (e.g., ultrasonic weld or a controlled melt), chemical-based surface manipulation (e.g., vulcanization), and/or other bonding process. Further note that the buffer zone 113 is at least in part co-located with the frangible region 102 of the underlying package 100.

Figure 1D:
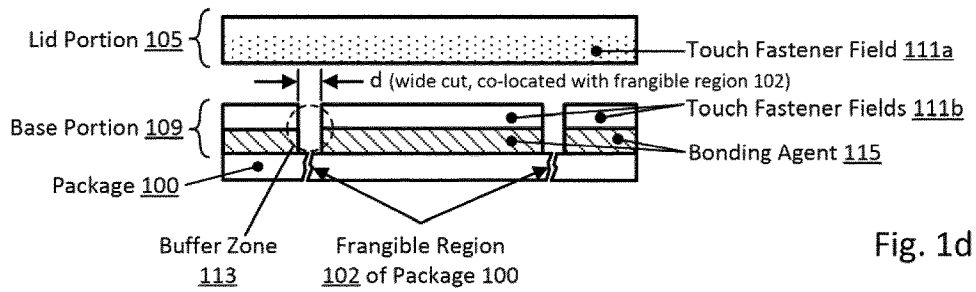

The example embodiment shown in FIG. 1d includes a relatively wide cut buffer zone 113 having a uniform thickness d, wherein the cut passes through both the base touch fastener field 111b and bonding agent 115. In addition, the frangible region 102 falls within the width d of the cut. The cut through the base touch fastener field 111b and bonding agent 115 could be made, for example, during fabrication of the closure 101 and prior to deployment of the closure 101 on the package 100. In such cases, the frangible region 102 could be formed in the package 100 prior to applying the closure 100 during the packaging process, and the closure 100 would be applied so the inner touch fastener field 111b is located within the area defined by the frangible region 102.

Figure 1E:
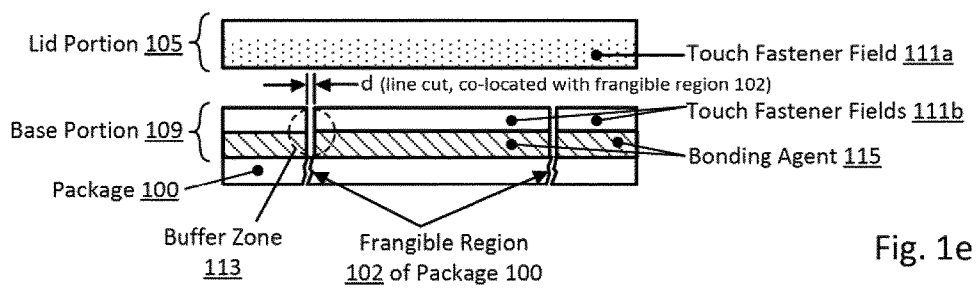

The example embodiment shown in FIG. 1e is similar to the one shown in FIG. 1d, except that it includes a relatively thin cut buffer zone 113, wherein the cut again has a uniform thickness d and passes through both the base touch fastener field 111b and bonding agent 115. In addition, the frangible region 102 falls within the width d of the cut, or is otherwise co-located with the cut line. Other relevant discussion with respect to FIG. 1d is equally applicable here, as will be appreciated in light of this disclosure. In some such embodiments, the cut through the base touch fastener field 111b and bonding agent 115 could be made, for example, after deployment of the closure 101 on the package 100. In such cases, the cut through the base touch fastener field 111b and bonding agent 115 could be made at substantially the same time the frangible region 102 is formed in the package 100, by using an appropriately configured rotary die cutter, flatbed die cutter, laser cutter, or other suitable cutting process. Alternatively, the base touch fastener field 111b and bonding agent 115 could be cut using one cutting process and the frangible region 102 could be formed using a perforating process.

Figure 1F:
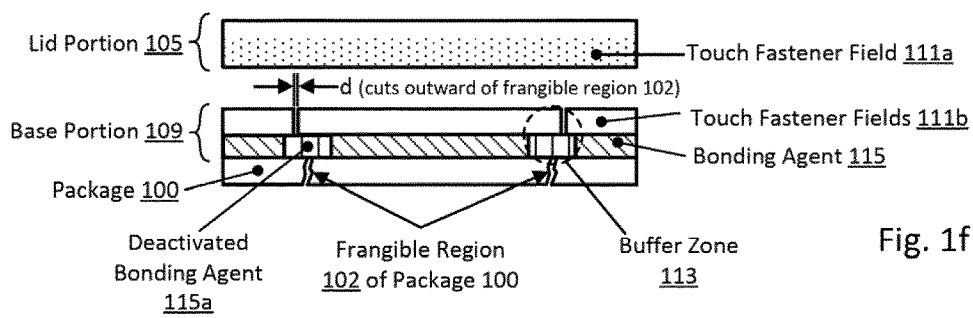

The example embodiment shown in FIG. 1f illustrates a buffer zone 113 that includes a relatively narrow cut that passes through the base touch fastener field 111b. The buffer zone 113 further includes one or more zones of deactivated bonding agent 115a. Note that the buffer zone has a non-uniform thickness in this example case (in particular, the buffer zone is relatively thin in the touch fastener layer and relatively thick in the bonding agent layer). The cut in the base touch fastener field 111b is outward of the frangible region but is co-located with the zone of deactivated bonding agent 115a. The frangible region 102 is also co-located with the zone of deactivated bonding agent 115a. As previously discussed, the bonding agent 115 may be an adhesive layer, which can be deactivated at select locations using a selectively applied varnish or lacquer treatment. Other selective bonding agent deactivation schemes can be used as well. In one such embodiment, the bonding deactivation agent can be applied through the cut line in the upper base touch fastener field 111b. In any case, once deactivated, the frangible region is completely or at least substantially free of active bonding agent that would otherwise impede removal of the area within with frangible region of the package material, in accordance with an embodiment.

Figure 1G:
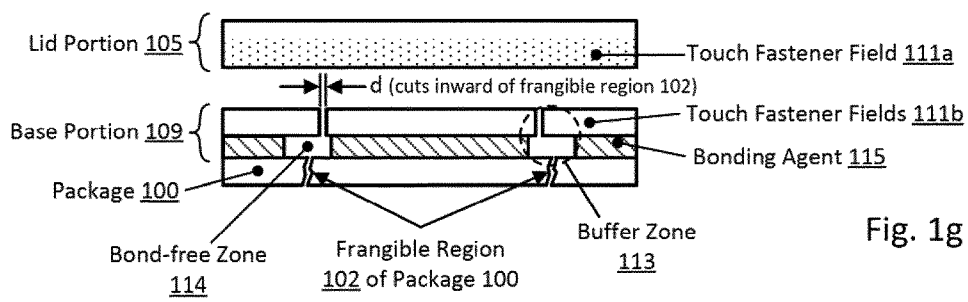
Figure 1H:
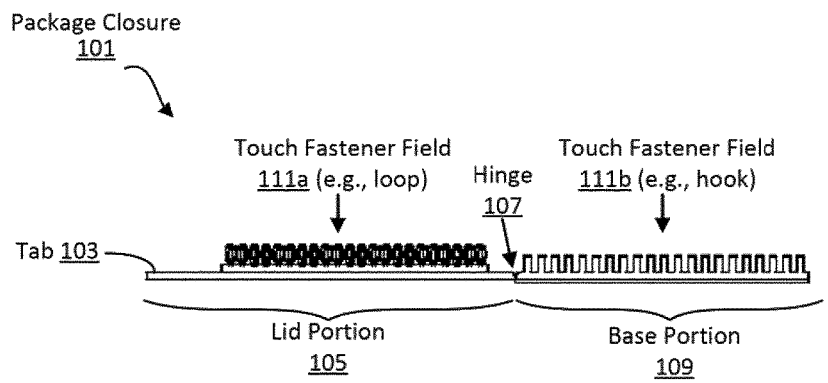
Figure 1I:
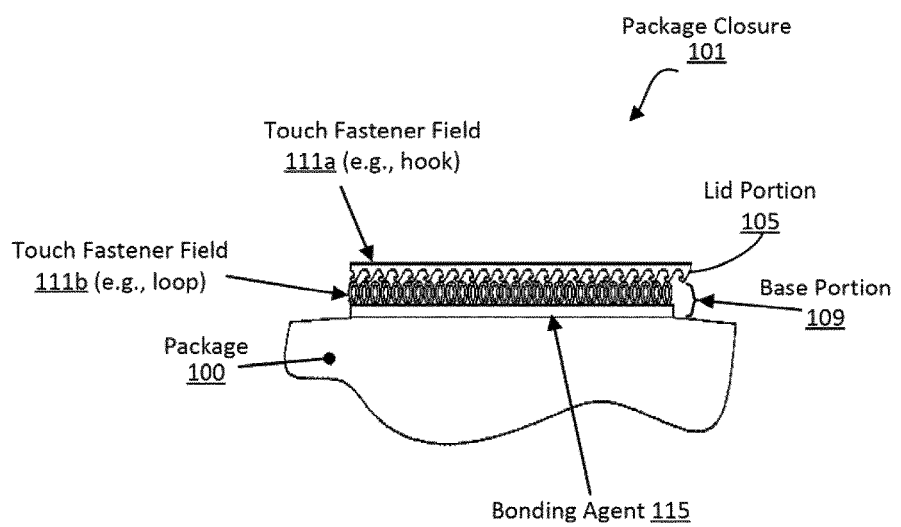
Figure 1J:
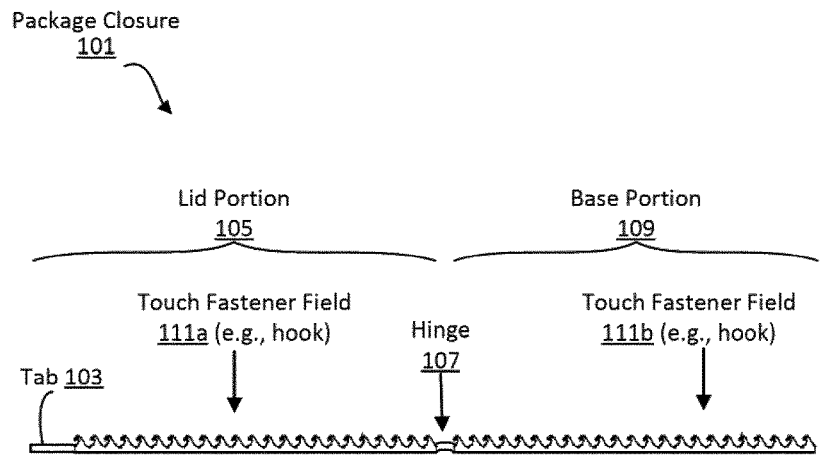
Figure 1K:
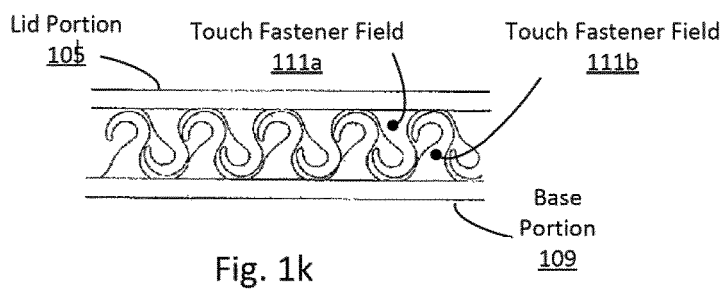
Figure 1L:
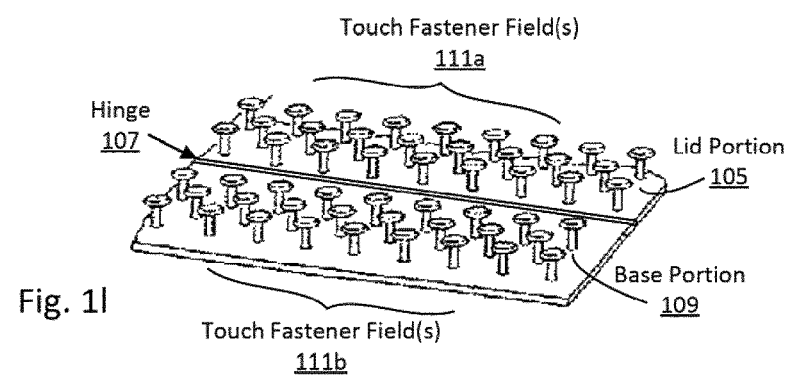

The example embodiment shown in FIG. 1g is similar to the example shown in FIG. 1f, in that it illustrates a buffer zone 113 that includes a relatively narrow cut that passes through the base touch fastener field 111b, and further includes one or more wider underlying bond-free zones 114. However, instead of having deactivated bonding agent such as deactivated adhesive or ultrasonic weld, there is actually no bonding agent deposited or otherwise formed in those locations. This can be accomplished, for example, using a print-based deposition process or other selective deposition process when applying an adhesive-based bonding agent 115. Alternatively, a selectively applied ultrasonic weld can be used. Further note in this example case, that the cut in the base touch fastener field 111b is inward of the frangible region but is still co-located with the bond-free zone 114. The frangible region 102 is also co-located with the bond-free zone 114. As will be appreciated, note that the cut in the base touch fastener field 111b can be outward of the frangible region 102 as well, and still be co-located with the bond-free zone 114.

In still other embodiments, note that it is possible that the underlying adhesive or other bonding agent 115 may overlap or straddle or extend into the frangible region 102 of the package material, particularly in embodiments where the inner touch fastener field(s) 111b that removes the frangible region 102 is configured in conjunction with the corresponding lid touch fastener field(s) 111a to provide enhanced peel strength. Such a configuration would allow the area within the frangible region 102 to be more aggressively pulled, torn, or otherwise removed, despite the existence of active bonding agent 115 overlapping the perforation line or other frangible region 102. Further note that the degree of bonding agent 115 overlap that can be allowed tends to increase with increasing peel strength in the area within the frangible region 102, as will be appreciated in light of this disclosure. To this end, in some embodiments, the peel strength in the area within bounded by the frangible region 102 is sufficiently high such that separation of the touch fastener fields 111a and 111b tasked with removal of the package material within the frangible region 102 will generally not occur once to the fields are joined. In such cases, the underlying package material can be removed, whether frangible or not, assuming a suitable lift force can be applied to the closure lid portion 105 during the first opening of the closure system.

In some cases, note that the outer field 111b of fastener elements surrounding the buffer zone 113 acts as an anti-tear feature, in accordance with some embodiments. In more detail, when pulling the frangible region (or the package material at the product access port area if there is no frangible region) by way of the lid-opening process, the underlying packaging material will ultimately start to break and tear. The closure system 100 can effectively stop this tear at the outer field 111b of fastener elements bonded with the packaging material 100, in accordance with some embodiments. Said differently, the tearing of the underlying packaging material 100, whether frangible or not, can effectively be limited or otherwise constrained to the packaging area within the outer field 111b of fastener elements, particularly when that field 111b completely surrounds the buffer zone 113.

FIGS. 1m-1r each illustrates a further example closure configuration configured in accordance with an embodiment. Each will now be discussed in turn. Numerous other configurations and variations will be apparent in light of this disclosure.

Figure 1M:
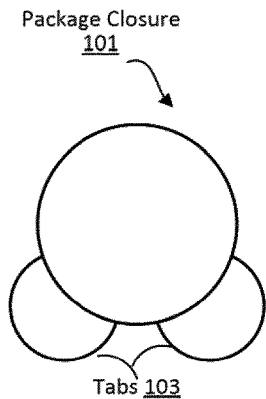
Figure 1N:
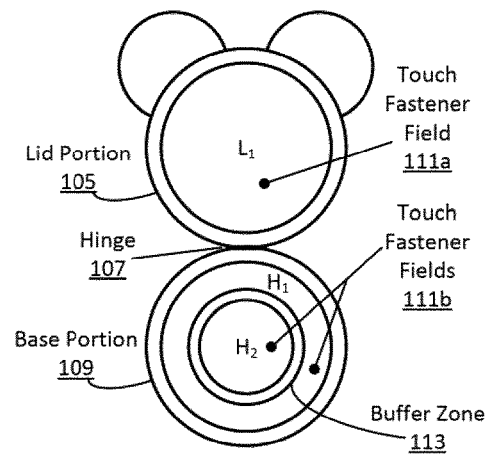

FIGS. 1m-1n collectively show a package closure 101 that is round in nature and is configured with two tabs 103. FIG. 1n further shows the lid portion 105 operatively coupled to the base portion 109 via the hinge 107. The lid portion 105 in this example case includes a single circular touch fastener field 111a that includes a first type of loop material ($L_1$). The base portion 109 includes two circular touch fastener fields 111b separated by a circular-ring shaped buffer zone 113. The outer field 111b includes a first type of hook material ($H_1$) and the inner field 111b includes a second type of hook material ($H_2$). The peel strength provided by $L_1$ and $H_1$ is lower (softer) than the peel strength provided by $L_1$ and $H_2$. As will be appreciated, such a configuration allows for auto-removal of the area within the frangible region of the underlying package once the closure 101 is installed thereon.

Figure 1O:
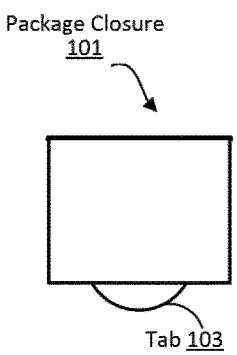
Figure 1P:
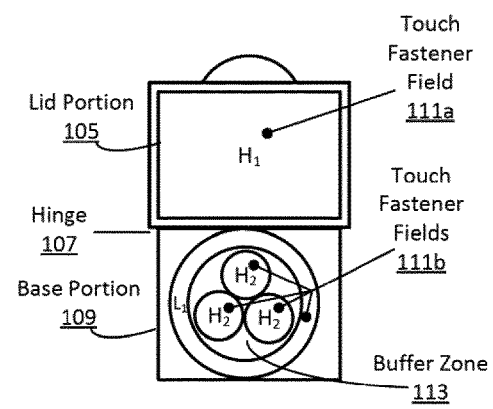

FIGS. 1o-1p collectively show a package closure 101 that is square in nature and is configured with one tab 103. FIG. 1p further shows the lid portion 105 operatively coupled to the base portion 109 via the hinge 107. The lid portion 105 in this example case includes a single square touch fastener field 111a that includes a first type of hook material ($H_1$). The base portion 109 includes three circular touch fastener fields 111b within a circular-ring shaped touch fastener field 111b. The outer ring-shaped field 111b includes a first type of loop material ($L_1$) and the inner three circular fields 111b each includes a second type of hook material ($H_2$). The peel strength provided by $L_1$ and $H_1$ is lower (softer) than the peel strength provided by $H_1$ and $H_2$, to allow for auto-removal of the area within the frangible region of the underlying package once the closure 101 is installed thereon.

Figure 1Q:
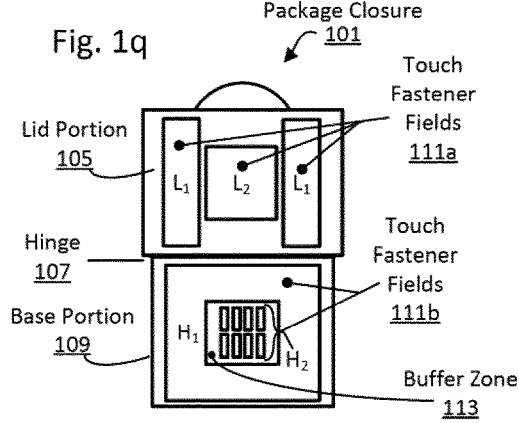

FIG. 1q shows another variation on the form factor shown in FIG. 1p. In this example case, the lid portion 105 includes two rectangular touch fastener fields 111a that each includes a first type of loop material ($L_1$) and a single square touch fastener field 111a that includes a second type of loop material ($L_2$). The base portion 109 includes eight rectangular touch fastener fields 111b within a square-ring shaped touch fastener field 111b. The outer square-ring shaped field 111b includes a first type of hook material ($H_1$) and the inner eight rectangular fields 111b each includes a second type of hook material ($H_2$). The peel strength provided by $L_1$ and $H_1$ is lower (softer) than the peel strength provided by $L_2$ and $H_2$, to allow for auto-removal of the area within the frangible region of the underlying package once the closure 101 is installed thereon.

Figure 1R:
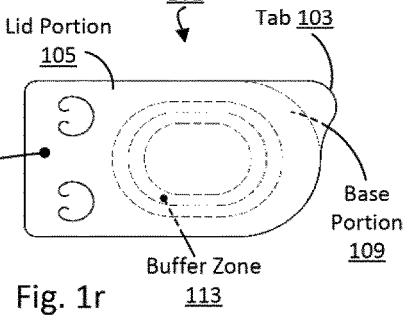

FIG. 1r shows another example package closure 101 form factor configured with an offset tab 103. The lid portion 105 is shown in the closed position, so some of the hidden closure features are shown in dash, including the oval-ring shaped buffer zone 113. The hinge 107 is configured with anti-peel flaps, which will be discussed in more detail with reference to FIGS. 5a-c. The lid portion 105 in this example case may include, for instance, a single touch fastener field 111a (not shown) shaped to the perimeter of the lid. The base portion 109 may include, for instance, a central oval-shaped touch fastener field 111b within a ring-shaped touch fastener field 111b. The outer ring-shaped field 111b may include a first type of loop material and the inner field 111b may include a second type of hook material, or both fields 111b can be the same. Variations will be apparent.

Figure 2A:
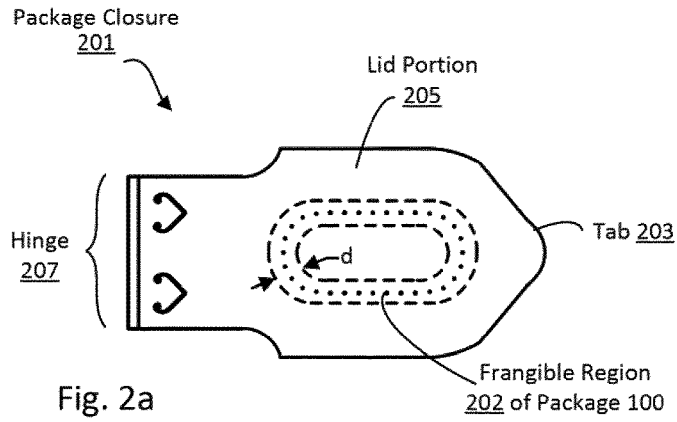
FIGS. 2a-2c each illustrates one or more example features of a reusable package closure system configured in accordance with another embodiment of the present disclosure.
Figure 2B:
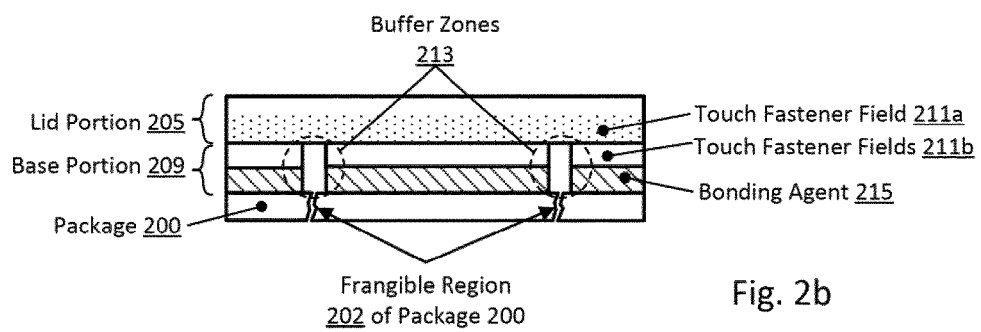
Figure 2C:
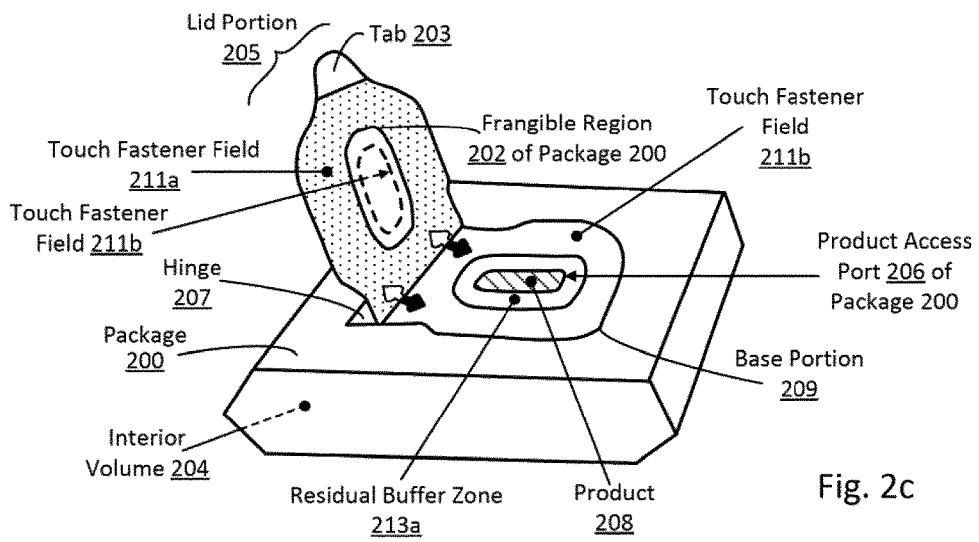

FIG. 2a-2c each illustrates one or more example features of a reusable package closure system configured in accordance with another embodiment of the present disclosure. As can be seen, other than the shape and form factor, this example embodiment can be configured in a similar fashion as to the various embodiments shown in FIGS. 1a-1r. It includes a lid portion 205 having a tab 203 and one or more touch fastener fields 211a, a base portion 209 having two or more touch fastener fields 211b, and a hinge 207 that allows the lid 205 to be raised between open and close positions. Also similar to the various embodiments shown in FIGS. 1a-1r, this example closure 201 can be adhered or otherwise bonded to a package 200 (e.g., flexible, rigid, semi-rigid). In particular, the base portion 209 is located on the package 200 such that a frangible region 202 of package 200 is located within the buffer zone 213 (as shown with a perforated line). FIG. 2a generally shows a top down view of the closure 101 in the closed position.

FIG. 2b further shows that the multi-layer buffer zone 213 generally includes or otherwise passes through a base touch fastener field 211b and bonding agent 215, which is used to secure the closure 201 to the underlying package 200. Just as with buffer zone 113, note that the buffer zone 213 is at least in part co-located with the frangible region 202 of the underlying package 200. The width d can vary from one embodiment to the next, as will be appreciated in light of this disclosure.

FIG. 2c shows a perspective of the closure 201 of FIGS. 2a and 2b in the opened position. As can be seen, the product 208 within the interior volume 204 of package 200 is now exposed, because the area within the frangible region 202 has been completely removed by operation of the user-provided lid-lift force in conjunction with lid touch fastener field 211a and the base touch fastener field 211b within the area defined by the frangible region 202. Once again, note that the area liberated by virtue of the frangible region 202 is now effectively part of a plug that further includes the base touch fastener field 211b within the area defined by the frangible region 202. This plug will help seal the product access port 206 when the lid 205 is closed again. Further note that there may be some residual buffer zone 213a left in place on the package 200, as previously explained. Other relevant discussion with respect to FIGS. 1a-1r is equally applicable here.

Hinging Features

Figure 3A:
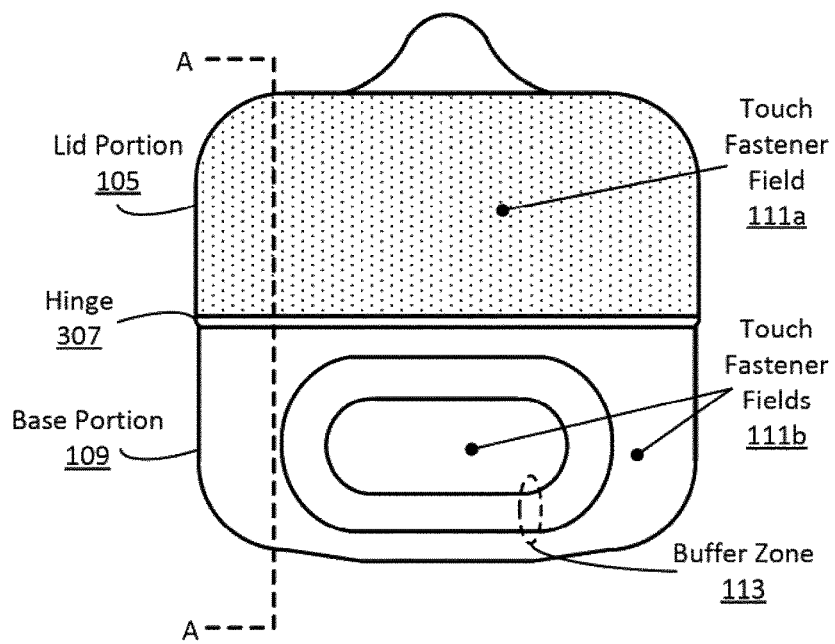
FIGS. 3a-3c each illustrates hinging techniques that can be used by a reusable package closure system configured in accordance with an embodiment of the present disclosure.
Figure 3B:
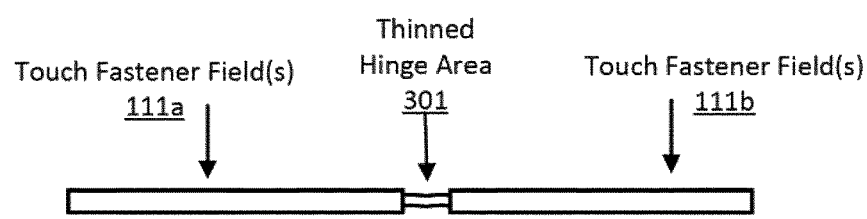
Figure 3C:
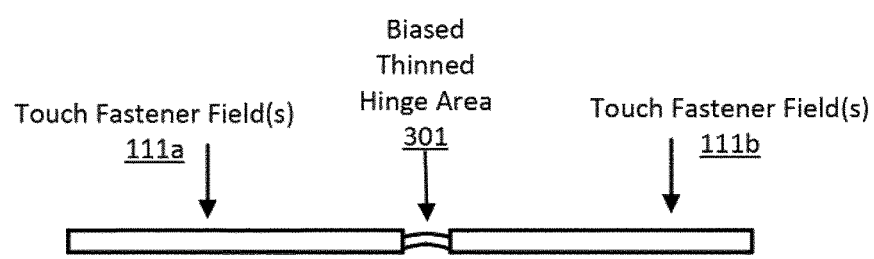

FIGS. 3a-3c each illustrates hinging techniques that can be used by a reusable package closure system configured in accordance with an embodiment of the present disclosure. In FIG. 3a, the hinge 307 may be implemented, for example, with a fold line, such as a thinned portion of the closure where the lid 105 is joined to or otherwise integrally formed with the base portion 109. In some embodiments, the hinge 307 may be biased or otherwise configured to stay in the open position when the lid touch fasteners are not engaged with the base touch fasteners. This thinning or biasing can be accomplished, for example, using heat and a rotary die shaping element that thins or otherwise profiles the hinge area 301 as shown in the cross-sections depicted in FIGS. 3b and 3c. The open position may be, for example, the case where the back of the lid 105 is laying on the packaging material 100 or otherwise close thereto so as to reduce its interference with the product access port of the package 100. In other such embodiments, the lid 105 may be biased to an open position that forms an oblique angle with the package 100 surface, wherein the oblique angle is in the range of, for instance, 10 to 89 degrees. Note that while the hinging techniques (as well as other features) may be discussed herein with reference to a specific embodiment (such as FIG. 1a), those same hinging techniques/features can be used with any other configurations or embodiments provided herein, as will be appreciated in light of this disclosure.

Figure 4A:
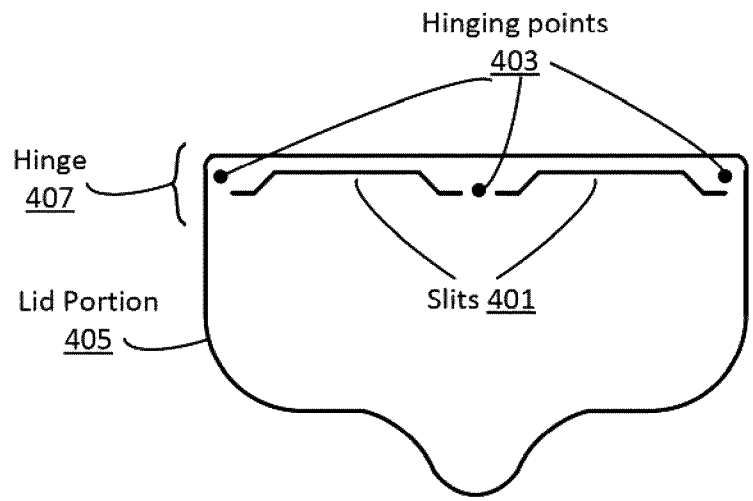
FIGS. 4a-4b collectively illustrate a hinging technique that can be used by a reusable package closure system configured in accordance with another embodiment of the present disclosure.
Figure 4B:
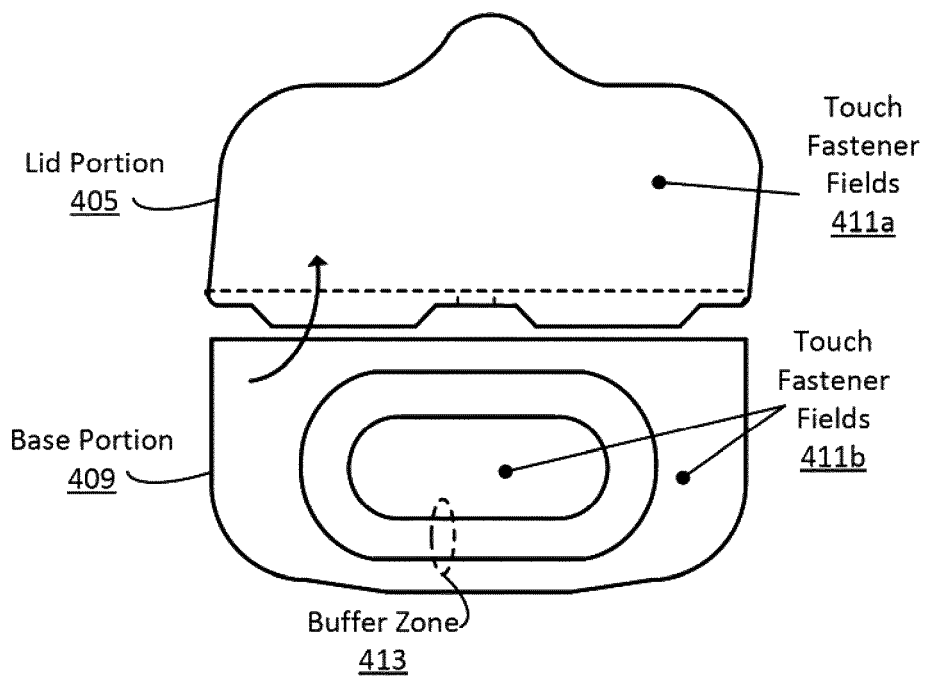

FIGS. 4a-4b collectively illustrate a hinging technique that can be used by a reusable package closure system configured in accordance with another embodiment of the present disclosure. In this example case, the hinge 407 and lid 405 are integral with one another but exist separately from the base portion 409. As can be seen, the hinge is formed by slits 401 selectively cut into the lid portion 405, such that the slits 401 effectively define three distinct hinging points 403. So, the back elongated portion of the lid 405 stays anchored to the package 100 when the lid is pulled upward, thereby causing the hinging action at the hinge points 403. In some such embodiments, the two tabs at the bottom of the lid that are defined by the slits 401 operate to hold the hinge 407 in the open position.

Anti-Peel Features

FIGS. 5a-5c each illustrates a hinging technique that can be used by a reusable package closure system configured in accordance with another embodiment of the present disclosure. In this example case, hinge 207 includes an anti-peel feature that prevents or otherwise inhibits complete removal of the lid. In particular, slits 501 are cut into the lid 205 so as to define flaps 503. The touch fasteners 211a on the lid 205 (including the flaps 503) operatively engage the touch fasteners 211b on the base portion 209. The hinge 207 may further include an optional fold or hinge line 505, which may be formed for example in a similar fashion to hinge 307 as shown in any of FIGS. 3a-3c. FIGS. 5b and 5c show example release progressions of two example anti-peel configurations, respectively, in accordance with the present disclosure. As the lid portion 205 is pulled from the base portion 209 in the direction indicated by arrow A, flaps 503 remain engaged with the touch fastener field 111b, thereby drawing those flaps 503 from the lid portion 205 until they can be past perpendicular and up to approximately 180° relative to the lid portion 205. Consequently, a peel force that is applied to the lid portion 205 to disengage the lid portion 205 from the base portion 209 becomes a shear force at flaps 503 in the direction indicated by the arrow S (shown in FIG. 5c), thereby providing an anti-peel effect. As such, the user will be less likely to completely pull past the fold/hinge line 505. Additional details regarding such anti-peel features can be found, for example, in U.S. Pat. Nos. 8,545,740 and 8,051,540, each of which is herein incorporated by reference in its entirety.

Methodology for Making Label-Based Closures

FIG. 6a illustrates a process for making a reusable package closure system, in accordance with an embodiment of the present disclosure. As can be seen, the methodology includes a process that laminates a hookless-hook layer 603 with a liner 601a and a loop layer 607, using a number of laminating rollers 611. The liner 601a includes shaped adhesive 601b, which generally corresponds to the hook fields of the base portion of the label-based closure, in accordance with one embodiment. The hookless-hook layer or tape 603 includes a hookless side 603a and a hook side 603b and can be formed, for example, via an extruding process or any other suitable forming technique using materials such as polyethylene and polypropylene. Transfer tape 609 is used to bond the loop layer 607 to the underlying hookless side 603a and adjacent to hook side 603b. In this example embodiment, the hook side 603b corresponds to the base portion of the closure and the loop layer 607 corresponds to the lid portion of the closure. The loop can be, for example, knit loop elements although any suitable loop elements can be used as will be appreciated.

Once all the layers are laminated, the resulting product is then presented to a rotary die cutting element 613a. In this example embodiment, the rotary die cutting element 613a is configured to define the overall shape of the closure (including the base and lid portions). The rotary die cutting element 613a is further configured to define the hook fields that will make up the base portion, including the hook field that will eventually reside within the area defined by the frangible region of the package as well as the outer hook field that is adjacent to the buffer zone. So, the rotary die cutter 613a cuts a ring portion within the hook side, as shown. The ring can then be removed to provide the buffer zone that separates the hook fields. Note the registration involved to ensure alignment of the shaped adhesive 601b with the rotary die cutting element 613a. In addition, the rotary die cutter 613a is also configured to provide a fold line at the laminate interface between the hook side and loop side. This fold line can be, for example, a thinned portion of the laminate product. In this sense, the rotary die cutter 613a is also a rotary die presser. Waste 617 is extracted from the resulting string of label-based closures, which at the label output 615 can be rolled and stored for later use in a flow-wrap process or provided directly to the label feed stage of such a process. With reference to FIG. 6a', note that the cross-section taken at line A-A shows no additional hinge material is used in this example embodiment. Further note that the label can later be folded and presented mated (closed) to a packaging customer (wet wipes packager, etc), if so desired. As previously indicated, note that the present disclosure is not intended to be limited to rotary die cutting; rather, any suitable cutting mechanisms can be used (e.g., semi-rotary die cut, flatbed die cutter, laser cutter, etc).

In another specific embodiment, a strip of hook-and-loop tape is formed by the process described in U.S. Pat. No. 8,549,714, which is herein incorporated by reference in its entirety.

As explained therein, edge margins of a strip of nonwoven material bond intimately with edge margins of the molten resin with which a strip of hook fasteners are integrally formed. The bond between the two strips is formed by encapsulating fibers of the loop material with the molten resin of the hook material, thereby forming a composite structure of joined strips of loop and hook components. The resulting strip of hook-and-loop tape can then be, for instance, laminated with hookless and loopless backing (for tab formation), and can then be presented to the rotary die cutting 613a to form the closures, as previously explained.

FIG. 6b illustrates a process for making a reusable package closure system, in accordance with another embodiment of the present disclosure. As can be seen, the methodology is similar to that shown in FIG. 6a except that the hookless-hook layer or tape 605 includes an underlying hinge material layer 605c (e.g., polyethylene or polypropylene) in addition to the hookless side 605a and hook side 605b, as shown in the cross-section taken at A-A (FIG. 6b'). The remainder of the process is effectively the same, except that the rotary die cutting element 613b is configured to define a hinge line at the laminate interface between the hook side and loop side. As previously explained, this hinge line may be, for example, a thinned area of the laminate and may be biased to provide a stay-open lid feature. To this end, the rotary die cutting element 613b can be shaped and otherwise used in conjunction with other processes (application of heat and pressure) to form the hinge. In other cases, a flatbed die cutter can be used to form the hinge (by pressing/thinning. Alternatively, a laser cutter can be used to create a thinned line of material (hinge or fold line).

FIG. 7 illustrates a process for making a reusable package closure system, in accordance with another embodiment of the present disclosure. As can be seen, the methodology includes a process that laminates a hookless-hook layer 705 with a liner 701 and a loop layer 707, using a number of laminating rollers 711. The hookless-hook layer or tape 705 includes a hookless side 705a and a hook side 705b and can be formed, for example, via an extruding process or any other suitable forming technique using materials such as polyethylene and polypropylene. The liner 701 is laminated to the hook side 705b using transfer tape 709a. Transfer tape 709b is used to bond the loop layer 707 to the underlying hookless side 705a and adjacent to hook side 705b. In this example embodiment, the hook side 705b corresponds to the base portion of the closure and the loop layer 707 corresponds to the lid portion of the closure. The hookless-hook tape may further include an underlying hinge material layer 705c, as shown in the cross-section taken at line A-A (FIG. 7').

Once all the layers are laminated, the resulting product is then presented to a rotary die cutting element 713. In this example embodiment, the rotary die cutting element 713 is configured to define the overall shape of the closure (including the base and lid portions). The hook fields that will make up the base portion, including the hook field that will eventually reside within the area defined by the frangible region of the package as well as the outer hook field that is adjacent to the buffer zone, can be defined later and in one embodiment at the same time the frangible region of the package is defined. In addition, the rotary die cutter 713 (or other suitable cutting mechanism) is also configured to provide a fold or hinge line at the laminate interface between the hook side and loop side. In some cases, as previously explained, the hinge may be biased to have a stay open position when the opposing fastener fields of the list and base are not engaged. This fold line can be, for example, a thinned portion of the laminate product. Waste 717 is extracted from the resulting string of label-based closures, which at the label output 715 can be rolled and stored for later use in a flow-wrap process or provided directly to the label feed stage of such a process. This is an example of a partially formed label-based closure mechanism, which can be subsequently dispensed onto packaging and then finished to provide a working closure as provided herein.

Figure 8:
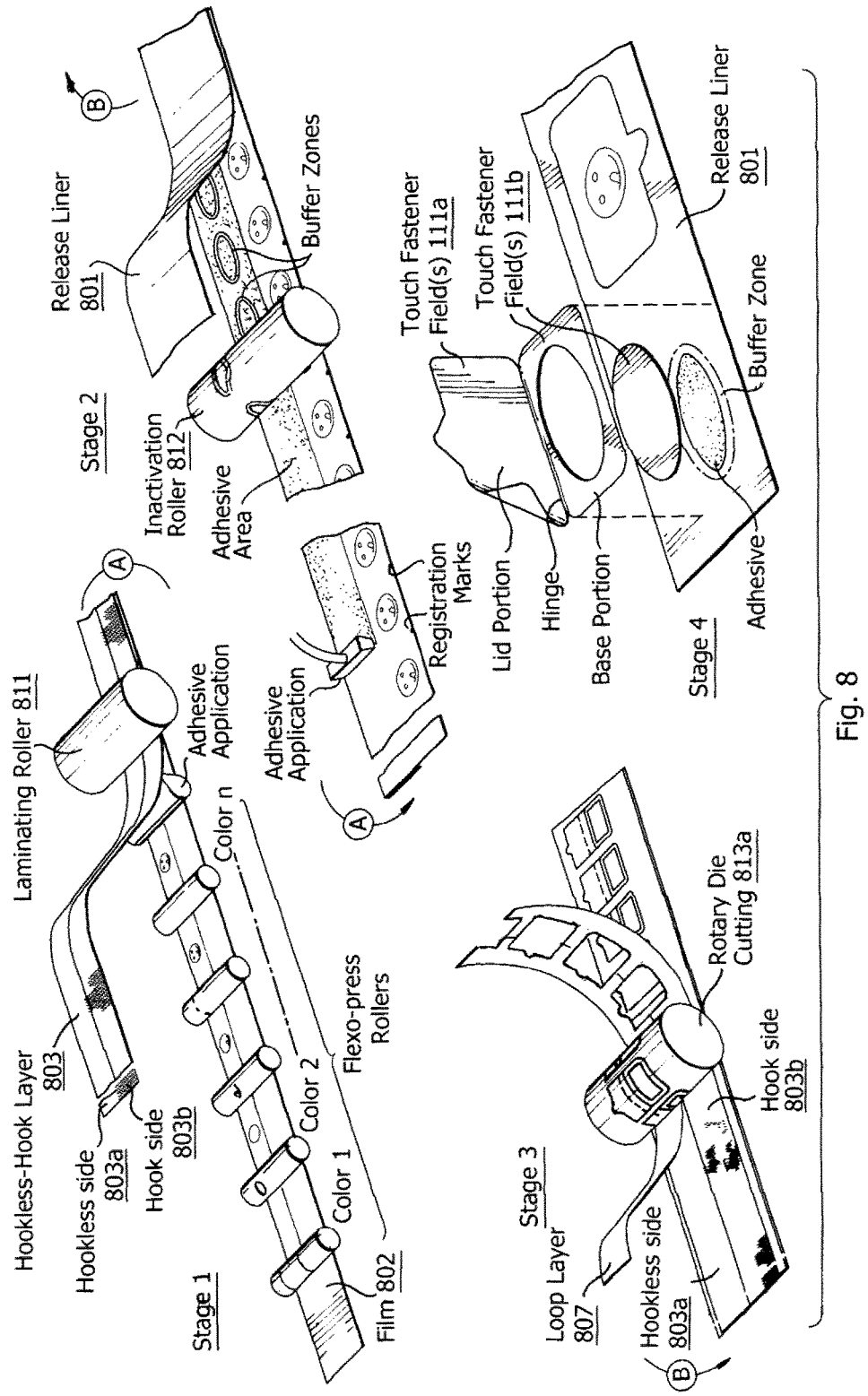
FIG. 8 illustrates a process for making a reusable package closure system, in accordance with another embodiment of the present disclosure.

FIG. 8 illustrates a process for making a reusable package closure system, in accordance with another embodiment of the present disclosure. As can be seen, the methodology includes a multi-stage process. Stage 1 generally a flexo-press printing and hook laminating process. In particular, a feed of film material 802 (e.g., polypropylene, polyethylene, or other suitable film material) is presented to a series of n flexo-press print rollers collectively configured to imprint a given design onto the film 802. Then, a hookless-hook layer 803 is laminated with the film 802, using a laminating roller 811. As can be seen, an adhesive is used to bond the film 802 to the hookless-hook layer 803. The resulting output of stage 1 is provided to the input of stage 2.

As can be further seen, an adhesive is applied to the underside of the hookless-hook layer 803 on the hook side. The feed is then provided to an inactivation roller 812, which is configured to selectively apply a deactivating agent to the adhesive. In one such embodiment, the inactivation roller 812 can be implemented with a flexographic head configured to provide a varnish or lacquer treatment in a toriodal pattern onto the adhesive layer. The shape of the inactivation element(s) on the roller 812 can vary from one embodiment to the next, as will be appreciated. Note that this shape effectively defines the thickness of the buffer zone in that layer. The feed now configured with inactivated adhesive regions can then be joined with a release liner 801. Note that registration marks can be used on the underlying film 802 to guide a machine vision registration process.

The output of stage 2 is now received at the input of stage 3. Here, a transfer tape or adhesive is used to bond the loop layer 807 to the underlying hookless side 803a and adjacent to hook side 803b. In this example embodiment, the hook side 803b corresponds to the base portion of the closure and the loop layer 807 corresponds to the lid portion of the closure. The hookless-hook layer 803 may further include an underlying hinge material layer, as previously discussed. At stage 4, the now fully formed closure is put in the closed position, by folding the lid down to the base portion. The excess release liner 801 material can be trimmed after the fold-over of the lids. The resulting feed can then be formed into a roll of closures, as will be appreciated. Also shown at stage 4 is an exploded view of the closure system on the underlying release liner 801, so as to show a centrally located bonding agent (adhesive in this case) surrounded by a buffer zone. The adhesive or other bonding agent on the outside of the buffer zone is not shown.

Methodology for Packaging

Figure 9:
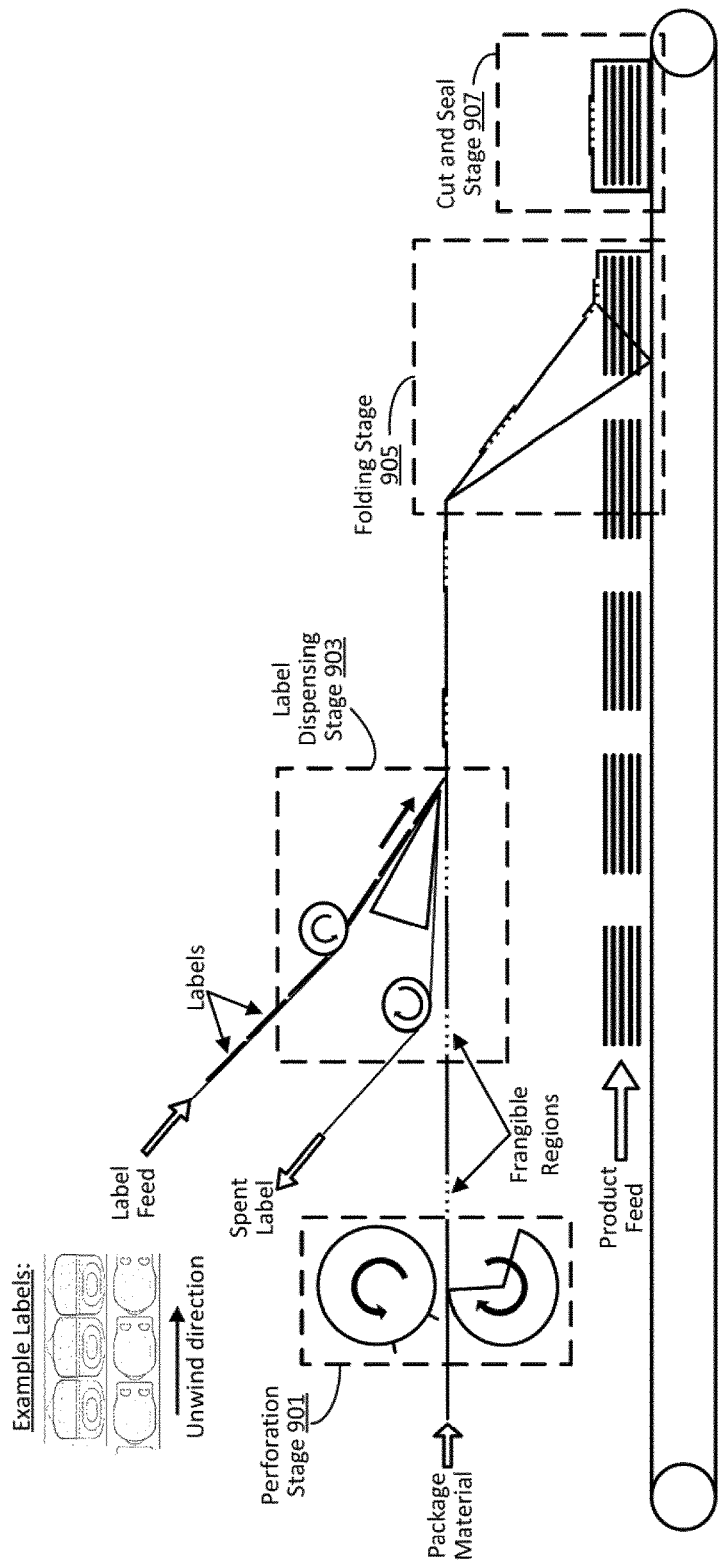
FIG. 9 illustrates a packaging process that utilizes a reusable package closure system configured in accordance with an embodiment of the present disclosure.

FIG. 9 illustrates a packaging process that utilizes a reusable package closure system configured in accordance with an embodiment of the present disclosure. Note that the label-based closures used in this example flow are complete once secured to the package material. As can be further seen, the process generally includes a perforation stage 901, a label dispensing stage 903, a folding stage 905, and a cut-and-seal stage 907. Each of these stages can be implemented using a standard flow-wrap machine. Customizations unique to the present disclosure will be apparent.

In operation, package material is received at the perforation stage 901, which generally includes two oppositely rotating wheels that are configured to perforate the package material thereby defining a frangible region, as normally done. The perforated package material is then fed to the label dispensing stage 903, which also receives a feed of label-based closures configured as provided herein. As can be further seen, the label feed is effectively registered with the package feed, such that the closures (or so-called labels) are peeled from the label liner and applied over the area within the frangible region (defined by a ring-shaped perforation in this example case). In particular, the label is applied such that the inner touch fastener field of the base portion of the label lands at least partially within the perforated region of the package material, such as variously shown in FIGS.

1a-1r. A tamping roller may be used to further secure the dispensed label-based closure to the underlying package material. The label waste is directed away from the process.

The labelled and perforated package material is then provided to the folding stage 905, which is configured to receive a product feed (e.g., stack of interleaved wet wipes, or any other product) and to wrap that product in the packaging material as normally done. The folding stage may further provide the lateral package seam, so as to form a package tube. The wrapped product is then provided to a conventional cut-and-seal stage 907, which trims any excess packaging material and seals the end seams to complete the flow-wrap packaging process. In other embodiments, the cut-and-seal stage 907 may also provide the lateral package seam that generally runs orthogonal to the end seams. The resulting package can then be boxed and shipped. Note that the product may be shipped with the closure in a closed or open position, and when opened for the first time the closure can be configured to remove the sacrificial area within the perforated or otherwise frangible region of the package so as to provide access to the product therein. In still other embodiments, such as those having enhanced peel strength in the lid area, the closure may be configured to remove the underlying package material even if that material is not perforated or otherwise frangible.

Figure 10:
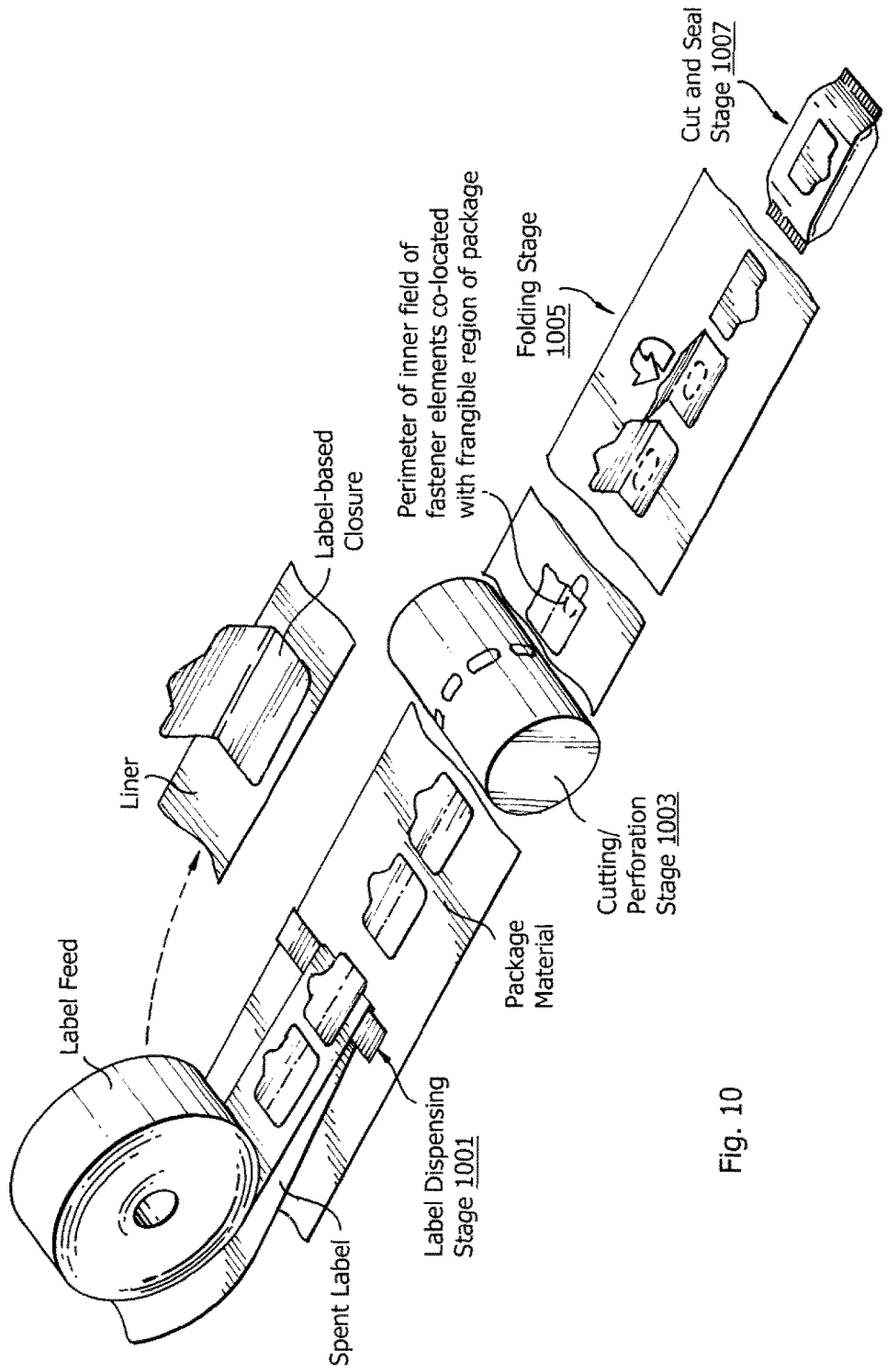
FIG. 10 illustrates a packaging process that utilizes a reusable package closure system configured in accordance with another embodiment of the present disclosure.

FIG. 10 illustrates a packaging process that utilizes a reusable package closure system configured in accordance with another embodiment of the present disclosure. In this example embodiment, the label-based closures used are only partially formed and can be completed during the flow-wrap process. In particular, the buffer zone of the closures is not yet formed (said differently, the touch fastener fields of the based portion are not yet liberated or otherwise formed).

As will be appreciated, the process may include stages similar to those shown in FIG. 9, including a perforation/cutting stage 1003, a label dispensing stage 1001, a folding stage 1005, and a cut-and-seal stage 1007, except that the perforation/cutting stage 1003 is located after the label dispensing stage in the process flow and may be further configured to complete the closure formation. Such a configuration can be used, for example, to eliminate or otherwise minimize the need to register the label feed with the underlying package material feed. In particular, there is no need to align the base touch fastener fields of the label-based closure with a pre-cut frangible region of the package material.

So, in accordance with one example embodiment, the label-based closure buffer zone can be formed at substantially the same time as the frangible region in the package material. This can be accomplished, for example, by a properly configured perforation/cutting stage 1003. For example, in one such case, the compressibility of the material stack (e.g., including fastener field 111b, bonding agent 115, and package 100) as it passes under the rotary die cutter 1003 is such that the cutting elements of the cutter 1003 pass through the base portion 109 of the stack to clean cut or otherwise liberate the touch fastener fields 111b and bonding agent 115, while only perforating or otherwise weakening the package 100. In one such case, the rotary cutter 1003 could be configured, for example, with a series of base cutting elements configured with perforating pins or cutting points that further extend orthogonally from the base cutting elements, thereby providing a multi-level cutting tool. The base cutting elements can be used to liberate the touch fastener fields 111b while the further extended perforating pins are adapted for forming the frangible region 102.

In another embodiment, multiple cutting stages can be used, such that one rotary die cutter could include the base cutting elements for liberating the touch fastener fields 111b, and another rotary die cutter could include the perforating pins adapted for forming the frangible region 102. The order of the cutting operations can be either way. In a more general sense, any suitable process for forming the desired cuts can be used. In any case, note that once the partially formed label is provisioned onto the package material, the need for registration of the two feeds is effectively eliminated. Further note that simultaneously cutting ensures that the frangible region is automatically co-located with the buffer zone. Again, the rotary die cutter can be replaced with other suitable cutting tools, such as a flatbed die cutter, laser cutter capable of cutting, shaping, thinning as variously explained herein.

Variations will be apparent in light of this disclosure. For instance, in some packaging applications, the package can be formed first. Then, once the product is sealed within the package, the closure can be applied to the package over an area having a pre-cut frangible region. The closure may be configured as variously provided herein, and may be flexible or rigid. The package may also be flexible or rigid. The product within the package may literally be any product that can be packaged (e.g., moist goods such as wet wipes and medical wipes, dry edible goods such as cereal or oats or other edible materials, hardware such as nuts and bolts, detergents and household cleaners, non-edible dry goods such as tissues or paper towels, or a bank for storing coins and such.

Further Example Embodiments

The following examples pertain to further embodiments, from which numerous permutations and configurations will be apparent.

Example 1 is a reusable closure system for packaging applications that include use of a frangible region to provide access to packaged product. The closure system comprises: a base configured to be bonded to product packaging material, the base further including first and second fields of touch fasteners separated by a multi-layer buffer zone that is configured to keep the frangible region substantially free of active bonding agent; and a hinged lid configured to open and close with respect to the base portion and to provide access to the packaged product via the frangible region when the lid is open, the lid further including a third field of touch fasteners configured to engage at least one of the first and second touch fastener fields when the lid is closed. The touch fasteners include at least one of hook and loop fastener elements.

Example 2 includes the subject matter of Example 1, wherein the first touch fastener field is configured for bonding within an area defined by the frangible region.

Example 3 includes the subject matter of Example 1 or 2, wherein the second touch fastener field completely surrounds the buffer zone.

Example 4 includes the subject matter of any of the previous Examples, wherein the multi-layer buffer zone has a uniform thickness through its layers.

Example 5 includes the subject matter of any of Examples 1-3, wherein the multi-layer buffer zone has a first thickness with respect to its layer that corresponds to the first and second touch fastener fields and a second thickness with respect to its layer that corresponds to bonding agent.

Example 6 includes the subject matter of Example 5, wherein the first thickness is thinner than the second thickness.

Example 7 includes the subject matter of any of the previous Examples, wherein the multi-layer buffer zone includes deactivated adhesive.

Example 8 includes the subject matter of any of the previous Examples, wherein the multi-layer buffer zone includes a zone that is free of any adhesive deposition.

Example 9 includes the subject matter of any of the previous Examples, wherein a hinging element of the hinged lid is biased to keep the lid in an open position when the third field of touch fasteners is not engaged with the first and second touch fastener fields.

Example 10 includes the subject matter of any of the previous Examples, wherein the first touch fastener field is associated with a first peel strength and the second touch fastener field is associated with a second peel strength. In some such cases, the second peel strength is less than the first peel strength.

Example 11 includes the subject matter of any of the previous Examples, wherein the first touch fastener field is configured for bonding within an area bounded by the frangible region and is further configured to automatically remove that bounded area upon first opening of the closure system once the closure system is deployed on a product package, thereby providing a product access port in the package.

Example 12 includes the subject matter of Example 11, wherein the joined first touch fastener field and bounded area of the package effectively form a plug for the product access port when the lid is closed.

Example 13 includes the subject matter of any of the previous Examples, wherein the first and second touch fastener fields comprise hook fasteners and the third touch fastener field comprises loop fasteners.

Example 14 includes the subject matter of any of the previous Examples, wherein the first, second, and third touch fastener fields comprise hook fasteners.

Example 15 is a roll of labels for use in a flow-wrap packaging process, wherein each label comprises the subject matter of any of the preceding Examples.

Example 16 is a container defining an interior volume, the container comprising: flexible sheet material bounding at least one side of the interior volume and forming an outer surface of the container, the flexible sheet material having a frangible region; a base bonded to the flexible sheet material over the frangible region, the base further including first and second fields of touch fasteners separated by a multi-layer buffer zone that is at least in part co-located with the frangible region and substantially free of active bonding agent; and a hinged lid configured to open and close with respect to the base portion and to provide access to product within the container via the frangible region when the lid is open, the lid further including a third field of touch fasteners configured to engage at least one of the first and second touch fastener fields when the lid is closed. The touch fasteners include at least one of hook and loop fastener elements. In addition, the base and hinged lid are of greater rigidity than the flexible sheet material.

Example 17 includes the subject matter of Example 16, wherein the multi-layer buffer zone has a uniform thickness through its layers.

Example 18 includes the subject matter of Example 16 or 17, wherein a hinging element of the hinged lid is biased to keep the lid in an open position when the third field of touch fasteners is not engaged with the first and second touch fastener fields.

Example 19 includes the subject matter of any of Examples 16-18, wherein the first touch fastener field is associated with a first peel strength and the second touch fastener field is associated with a second peel strength. In some such cases, the second peel strength is less than the first peel strength.

Example 20 includes the subject matter of any of Examples 16-19, wherein the first touch fastener field is configured for bonding within an area bounded by the frangible region and is further configured to automatically remove that bounded area upon first opening of the closure system, thereby providing a product access port in the package.

Example 21 includes the subject matter of Example 20, wherein the joined first touch fastener field and bounded area of the package effectively form a plug for the product access port when the lid is closed.

Example 22 is a flexible reusable closure system for flexible packaging applications that include use of a frangible region to provide access to packaged product. The closure system comprises: a flexible base configured with adhesive for adhering the base to product packaging material, the base further including first and second fields of touch fasteners separated by a multi-layer buffer zone that is configured to keep the frangible region substantially free of active adhesive; and a flexible hinged lid configured to open and close with respect to the base portion and to provide access to the packaged product via the frangible region when the lid is open, the lid further including a third field of touch fasteners configured to engage at least one of the first and second touch fastener fields when the lid is closed. The touch fasteners include at least one of hook and loop fastener elements. The first touch fastener field is bonded within an area defined by the frangible region, and the second touch fastener field at least partially surrounds the buffer zone.

Example 23 includes the subject matter of Example 22, wherein the multi-layer buffer zone includes a first layer that corresponds to a touch fastener layer of the closure system and a second layer that corresponds to a bonding layer of the closure system, the bonding layer comprising at least one of adhesive and a surface to be bonded by physical and/or chemical action.

Example 24 includes the subject matter of Example 22 or 23, wherein: the first touch fastener field is associated with a first peel strength and the second touch fastener field is associated with a second peel strength that is different than (e.g., less than) the first peel strength;

the first touch fastener field is configured for adhering within an area bounded by the frangible region and is further configured to automatically remove that bounded area upon first opening of the closure system, thereby providing a product access port; and the joined first touch fastener field and bounded area of the package effectively form a plug for the product access port when the lid is closed.

Example 25 includes a container defining an interior volume, the container comprising: flexible sheet material bounding at least one side of the interior volume and forming an outer surface of the container, the flexible sheet material having a frangible region; and the closure system of any of Examples 22-24 adhered to the flexible sheet material over the frangible region.

Example 26 includes the subject matter of any of the previous Examples, wherein the multilayer buffer zone is substantially free of active bonding agent such that 70% or more of total area of the frangible region has no bonding agent thereon, once the closure system is bonded to the product packaging material (or flexible sheet material).

Example 27 includes the subject matter of any of Examples 16-21 or 25, wherein the multilayer buffer zone is at least in part co-located with the frangible region and substantially free of active bonding agent, such that 70% or more of total area of the frangible region has no bonding agent thereon.

Example 28 includes the subject matter of any of the previous Examples, wherein at least one of the multi-layer buffer zone and the frangible region (if included) includes deactivated bonding agent that does not impede removal of the frangible area as would active bonding agent.

Example 29 includes the subject matter of any of the previous Examples, wherein the bonding agent comprises adhesive. The adhesive may be in any form, such as in the form of a deposited layer or pattern, tape, or any other substance or material that can be applied to object surfaces so as to bind those objects together and resist separation.

Example 30 includes the subject matter of any of the previous Examples, wherein the bonding agent comprises one or more welds. The weld may be in any form, such as in the form of an ultrasonic weld, thermal weld or bond, or any other weld that can be applied to object surfaces so as to bind those objects together and resist separation.

Example 31 includes the subject matter of any of the previous Examples, wherein the active bonding agent comprises at least one of adhesive and a surface to be bonded by physical and/or chemical action.

Example 32 includes the subject matter of any of the previous Examples, wherein the multi-layer buffer zone passes through a touch fastener layer of the closure system and a bonding layer of the closure system, the bonding layer comprising at least one of adhesive and a surface to be bonded by physical or chemical action.

Example 33 is a method for making a reusable closure system for packaging applications that include use of a frangible region to provide access to packaged product. The method comprises: forming a base configured to bond to product packaging material, the base further including first and second fields of touch fasteners separated by a multi-layer buffer zone that is configured to keep the frangible region substantially free of active bonding agent; and forming a hinged lid configured to open and close with respect to the base portion and to provide access to the packaged product via the frangible region when the lid is open, the lid further including a third field of touch fasteners configured to engage at least one of the first and second touch fastener fields when the lid is closed; wherein the touch fasteners include at least one of hook and loop fastener elements.

Example 34 includes the subject matter of Example 33, wherein the first touch fastener field is configured for bonding within an area defined by the frangible region, and the second touch fastener field at least partially surrounds the buffer zone.

Example 35 includes the subject matter of Example 33 or 34, wherein the multi-layer buffer zone has a uniform thickness through its layers.

Example 36 includes the subject matter of Example 33 or 34, wherein the multi-layer buffer zone has a first thickness with respect to its layer that corresponds to the first and second touch fastener fields and a second thickness with respect to its layer that corresponds to the active bonding agent. In some such cases, the first thickness is thinner than the second thickness. Example 37 includes the subject matter of any of Examples 33-36, wherein the bonding agent comprises adhesive and the multi-layer buffer zone includes at least one of deactivated adhesive deposition and a zone that is free of any adhesive deposition.

Example 38 includes the subject matter of any of Examples 33-37, wherein forming a hinged lid includes forming a hinging element that is biased to keep the lid in an open position when the third field of touch fasteners is not engaged with the first and second touch fastener fields.

Example 39 includes the subject matter of any of Examples 33-38, wherein the first and second touch fastener fields comprise hook fasteners and the third touch fastener field comprises loop fasteners. Alternatively, the first, second, and third touch fastener fields all comprise hook fasteners.

Example 40 includes the subject matter of any of Examples 33-39, wherein forming a base configured to bond to product packaging material, comprises: laminating a fastenerless-fastener layer with a liner to provide a first laminate, the liner including shaped adhesive that generally corresponds to the first and second fields of the base portion, wherein the fastenerless-fastener layer includes a fastenerless portion on one side and a first fastener portion on that same side.

Example 41 includes the subject matter of Example 40, wherein the fastenerless-fastener layer is a hookless-hook layer.

Example 42 includes the subject matter of Example 40 or 41, wherein forming a hinged lid configured to open and close with respect to the base portion, comprises: laminating the first laminate with a second fastener portion to bond the second fastener portion to the underlying fastenerless portion and adjacent to the first fastener portion, thereby providing a second laminate.

Example 43 includes the subject matter of Example 42, wherein forming a hinged lid configured to open and close with respect to the base portion, further comprises: at least one of cutting and pressing the second laminate to define at least one of an overall shape of the base and hinged lid, the first and second fields of touch fasteners, and a fold or hinge line between the first fastener portion and the second fastener portion.

Example 44 includes the subject matter of Example 42 or 43, wherein the fastenerless-fastener layer further includes an underlying hinge material layer.

Example 45 includes the subject matter of any of Examples 42-44, wherein forming a hinged lid configured to open and close with respect to the base portion, further comprises: pressing the second laminate to define a hinge biased to provide a stay-open lid feature.

Example 46 includes the subject matter of any of Examples 33-39, wherein forming a base configured to bond to product packaging material, comprises: laminating a fastenerless-fastener layer with a liner to provide a first laminate, wherein the fastenerless-fastener layer includes a fastenerless portion on one side and a first fastener portion on that same side.

Example 47 includes the subject matter of Example 46, wherein the liner is laminated to the first fastener portion using at least one of a first transfer tape and adhesive. In some such cases, the fastenerless-fastener layer is a hookless-hook layer.

Example 48 includes the subject matter of Example 46 or 47, wherein forming a hinged lid configured to open and close with respect to the base portion, comprises: laminating the first laminate with a second fastener portion using at least one of a second transfer tape and adhesive to bond the second fastener portion to the underlying fastenerless portion and adjacent to the first fastener portion, thereby providing a second laminate.

Example 49 includes the subject matter of Example 48, wherein forming a hinged lid configured to open and close with respect to the base portion, further comprises: at least one of cutting and pressing the second laminate to define at least one of an overall shape of the base and hinged lid, the first and second fields of touch fasteners, and a fold or hinge line between the first fastener portion and the second fastener portion.

Example 50 includes the subject matter of Example 48 or 49, wherein the fastenerless-fastener layer further includes an underlying hinge material layer.

Example 51 includes the subject matter of any of Examples 48-50, wherein forming a hinged lid configured to open and close with respect to the base portion, further comprises: pressing the second laminate to define a hinge biased to provide a stay-open lid feature.

Example 52 is a method for making a reusable closure system for packaging applications that include use of a frangible region to provide access to packaged product. The method comprises: forming a base configured to bond to product packaging material, the base further including first and second fields of touch fasteners separated by a multi-layer buffer zone that is configured to keep the frangible region substantially free of active bonding agent, the forming including laminating a fastenerless-fastener layer with a liner to provide a first laminate, the liner including shaped adhesive that generally corresponds to the first and second fields of the base portion, wherein the fastenerless-fastener layer includes a fastenerless portion on one side and a first fastener portion on that same side, wherein the first touch fastener field is configured for bonding within an area defined by the frangible region, and the second touch fastener field at least partially surrounds the buffer zone; and forming a hinged lid configured to open and close with respect to the base portion and to provide access to the packaged product via the frangible region when the lid is open, the lid further including a third field of touch fasteners configured to engage at least one of the first and second touch fastener fields when the lid is closed, the forming including: laminating the first laminate with a second fastener portion to bond the second fastener portion to the underlying fastenerless portion and adjacent to the first fastener portion, thereby providing a second laminate; and at least one of cutting and pressing the second laminate to define at least one of an overall shape of the base and hinged lid, the first and second fields of touch fasteners, and a fold or hinge line between the first fastener portion and the second fastener portion. The touch fasteners include at least one of hook and loop fastener elements.

Example 53 includes the subject matter of Example 52, wherein the multi-layer buffer zone has a uniform thickness through its layers.

Example 54 includes the subject matter of Example 52 or 53, wherein the at least one of cutting and pressing the second laminate, comprises: pressing the second laminate to define a hinge biased to provide a stay-open lid feature.

Example 55 is a method for making a reusable closure system for packaging applications that include use of a frangible region to provide access to packaged product. The method comprises: forming a base configured to bond to product packaging material, the base further including first and second fields of touch fasteners separated by a multi-layer buffer zone that is configured to keep the frangible region substantially free of active bonding agent, the forming including laminating a fastenerless-fastener layer with a liner to provide a first laminate, wherein the fastenerless-fastener layer includes a fastenerless portion on one side and a first fastener portion on that same side; and forming a hinged lid configured to open and close with respect to the base portion and to provide access to the packaged product via the frangible region when the lid is open, the lid further including a third field of touch fasteners configured to engage at least one of the first and second touch fastener fields when the lid is closed, the forming including: laminating the first laminate with a second fastener portion to bond the second fastener portion to the underlying fastenerless portion and adjacent to the first fastener portion, thereby providing a second laminate; and at least one of cutting and pressing the second laminate to define at least one of an overall shape of the base and hinged lid, the first and second fields of touch fasteners, and a fold or hinge line between the first fastener portion and the second fastener portion. The touch fasteners include at least one of hook and loop fastener elements.

Example 56 includes the subject matter of Example 55, wherein the at least one of cutting and pressing the second laminate, comprises: pressing the second laminate to define a hinge biased to provide a stay-open lid feature.

Example 57 includes the subject matter of Example 55 or 56, wherein the multilayer buffer zone is at least in part co-located with the frangible region such that 70% or more of total area of the frangible region has no bonding agent thereon.

Example 58 includes the subject matter of any of Examples 33-57, wherein the bonding agent comprises adhesive.

Example 59 includes the subject matter of any of Examples 33-58, wherein the bonding agent comprises a weld.

Example 60 includes the subject matter of any of Examples 33-59, wherein the multi-layer buffer zone passes through a touch fastener layer of the closure system and a bonding layer of the closure system, the bonding layer comprising at least one of adhesive and a surface to be bonded by physical or chemical action.

Example 61 is a method for packaging applications that include use of a frangible region to provide access to packaged product. The method comprises: applying a reusable closure system to a flexible packaging material, and wrapping a product in the flexible packaging material, wherein the closure system provides access to the frangible region and the frangible region provides access to the product within the flexible packaging material. The reusable closure system comprises: a base configured to bond to the flexible packaging material, the base further including first and second fields of touch fasteners separated by a multi-layer buffer zone that is at least in part co-located with the frangible region and substantially free of active bonding agent such that there is little or no active bonding agent overlapping the frangible region; and a hinged lid configured to open and close with respect to the base portion, the lid further including a third field of touch fasteners configured to engage at least one of the first and second touch fastener fields when the lid is closed. The touch fasteners include at least one of hook and loop fastener elements.

Example 62 includes the subject matter of Example 61, wherein the reusable package closure system is configured as a flexible label and is provided onto the flexible package material from a label dispensing stage.

Example 63 includes the subject matter of Example 61 or 62, wherein the reusable package closure system is complete upon its application to the flexible package material.

Example 64 includes the subject matter of Example 61 or 62, wherein the reusable package closure system is incomplete upon its application to the flexible package material.

Example 65 includes the subject matter of Example 64, wherein the reusable closure system bonded to the flexible package material is received at a cutting stage, the method further comprising cutting the reusable closure system to define the first and second fields of touch fasteners.

Example 66 includes the subject matter of Example 65, the method further comprising forming the frangible region so that it is co-located with the buffer zone.

Example 67 includes the subject matter of Example 66, wherein the cutting and forming are performed by a common cutting action.

Example 68 includes the subject matter of any of Examples 61-66, wherein the flexible package material is received at a perforation stage prior to the reusable closure system being applied, the method further comprising perforating the flexible package material thereby forming the frangible region, and wherein the reusable closure system is applied to the packaging material so that the first field of touch fasteners bonds to an area bounded by the frangible region.

Example 69 is a method for packaging applications that include use of a frangible region to provide access to packaged product. The method comprises: providing a feed of flexible packaging material; applying a reusable closure system to the packaging material; providing a feed of product; and wrapping a product from the product feed in the flexible packaging material, wherein the closure system provides access to the frangible region and the frangible region provides access to the product within the flexible packaging material. The reusable closure system comprises: a base configured to bond to the flexible packaging material, the base further including first and second fields of touch fasteners separated by a multilayer buffer zone that is at least in part co-located with the frangible region and substantially free of active bonding agent such that 70% or more of total area of the frangible region has no bonding agent thereon; and a hinged lid configured to open and close with respect to the base portion, the lid further including a third field of touch fasteners configured to engage at least one of the first and second touch fastener fields when the lid is closed. The touch fasteners include at least one of hook and loop fastener elements.

Example 70 includes the subject matter of Example 69, wherein the reusable package closure system is configured as a flexible label and is provided onto the flexible package material from a label dispensing stage.

Example 71 includes the subject matter of Example 69 or 70, wherein the reusable package closure system is complete upon its application to the flexible package material.

Example 72 includes the subject matter of Example 69 or 70, wherein the reusable package closure system is incomplete upon its application to the flexible package material.

Example 73 includes the subject matter of Example 72, wherein the reusable closure system bonded to the flexible package material is received at a cutting stage, the method further comprising cutting the reusable closure system to define the first and second fields of touch fasteners.

Example 74 includes the subject matter of Example 73, the method further comprising forming the frangible region so that it is co-located with the buffer zone.

Example 75 includes the subject matter of Example 74, wherein the cutting and forming are performed by a common cutting action.

Example 76 includes the subject matter of any of Examples 69-74, wherein the flexible package material is received at a perforation stage prior to the reusable closure system being applied, the method further comprising perforating the flexible package material thereby forming the frangible region, and wherein the reusable closure system is applied to the packaging material so that the first field of touch fasteners bonds to an area bounded by the frangible region.

Example 77 is a flow-wrap packaging method for packaging applications that include use of a frangible region to provide access to packaged product. The method comprises: providing a feed of flexible packaging material; applying, at a label dispensing stage, a label-based closure system to the packaging material; providing a feed of product; and wrapping a product from the product feed in the flexible packaging material, wherein the closure system provides access to the frangible region and the frangible region provides access to the product within the flexible packaging material. The closure system comprises: a base configured to bond to the flexible packaging material, the base further including first and second fields of touch fasteners separated by a multilayer buffer zone that is at least in part co-located with the frangible region and substantially free of active bonding agent such that there is little or no active bonding agent overlapping the frangible region; and a hinged lid configured to open and close with respect to the base portion, the lid further including a third field of touch fasteners configured to engage at least one of the first and second touch fastener fields when the lid is closed. The touch fasteners include at least one of hook and loop fastener elements.

Example 78 includes the subject matter of Example 77, wherein the package closure system is complete upon its application to the flexible package material, and the flexible package material is received at a perforation stage prior to the closure system being applied, the method further comprising perforating the flexible package material thereby forming the frangible region, and wherein the closure system is applied to the packaging material so that the first field of touch fasteners bonds to an area bounded by the frangible region.

Example 79 includes the subject matter of Example 77, wherein the package closure system is incomplete upon its application to the flexible package material, and the closure system bonded to the flexible package material is received at a perforation stage, the method further comprising cutting the closure system to define the first and second fields of touch fasteners.

Example 80 includes the subject matter of Example 79, the method comprising forming the frangible region so that it is co-located with the buffer zone.

Example 81 includes the subject matter of any of Examples 77-80, wherein, because the multilayer buffer zone is at least in part co-located with the frangible region and substantially free of active bonding agent, 70% or more of total area of the frangible region has no bonding agent thereon.

Example 82 includes the subject matter of any of Examples 77-81, wherein the multi-layer buffer zone has a first thickness with respect to its layer that corresponds to the first and second touch fastener fields and a second thickness with respect to its layer that corresponds to bonding agent. In some such cases, the first thickness is thinner than the second thickness.

Example 83 includes the subject matter of any of Examples 77-82, wherein the frangible region includes deactivated bonding agent that does not impede removal of the frangible area as would active bonding agent.

Example 84 includes the subject matter of any of Examples 77-83, wherein the bonding agent comprises adhesive.

Example 85 includes the subject matter of any of Examples 77-84, wherein the bonding agent comprises a weld.

Example 86 includes the subject matter of any of Examples 77-85, wherein the multi-layer buffer zone includes a first layer that corresponds to a touch fastener layer of the closure system and a second layer that corresponds to a bonding layer of the closure system, the bonding layer comprising at least one of adhesive and a surface to be bonded by physical or chemical action.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A reusable closure system for packaging applications that include use of a frangible region to provide access to packaged product, the closure system comprising:
    a base configured to be bonded to product packaging material, the base further including first and second fields of touch fasteners separated by a multi-layer buffer zone that is configured to keep the frangible region substantially free of active bonding agent; and
    a hinged lid configured to open and close with respect to the base and to provide access to the packaged product via the frangible region when the hinged lid is open, the hinged lid further including a third field of touch fasteners configured to engage at least one of the first or second touch fastener fields when the hinged lid is closed;
    wherein the first, second, and third touch fastener fields include at least one of hook or loop fastener elements; and
    wherein the multi-layer buffer zone includes deactivated adhesive.

2. The closure system of claim 1 wherein the first touch fastener field is configured for bonding within an area defined by the frangible region.

3. The closure system of claim 1 wherein the second touch fastener field completely surrounds the multi-layer buffer zone.

4. The closure system of claim 1 wherein the multi-layer buffer zone has a uniform thickness through its layers.

5. The closure system of claim 1 wherein the multi-layer buffer zone has a first thickness with respect to its layer that corresponds to the first and second touch fastener fields and a second thickness with respect to its layer that corresponds to bonding agent.

6. The closure system of claim 5 wherein the first thickness is thinner than the second thickness.

7. The closure system of claim 1 wherein the multi-layer buffer zone includes a zone that is free of any adhesive deposition.

8. The closure system of claim 1 wherein a hinging element of the hinged lid is biased to keep the hinged lid in an open position when the third field of touch fasteners is not engaged with the first and second touch fastener fields.

9. The closure system of claim 1 wherein the first touch fastener field is associated with a first peel strength and the second touch fastener field is associated with a second peel strength that is less than the first peel strength.

10. The closure system of claim 1 wherein the first touch fastener field is configured for bonding within an area bounded by the frangible region and is further configured to automatically remove that bounded area upon first opening of the closure system once the closure system is deployed on a product package, thereby providing a product access port in the product package.

11. The closure system of claim 10 wherein the first touch fastener field is configured to, along with the bounded area of the product package, effectively form a plug for the product access port when the hinged lid is closed.

12. The closure system of claim 1 wherein the first and second touch fastener fields comprise hook fasteners and the third touch fastener field comprises loop fasteners.

13. The closure system of claim 1 wherein the first, second, and third touch fastener fields comprise hook fasteners.

14. A roll of labels for use in a flow-wrap packaging process, wherein each label comprises the closure system of claim 1.

15. The closure system of claim 1 wherein the first and second touch fastener fields are separated by the multi-layer buffer zone on at least two sides of the first touch fastener field.

16. A container defining an interior volume, the container comprising:
    flexible sheet material bounding at least one side of the interior volume and forming an outer surface of the container, the flexible sheet material having a frangible region;
    a base bonded to the flexible sheet material over the frangible region, the base further including first and second fields of touch fasteners separated by a multi-layer buffer zone that is at least in part co-located with the frangible region and substantially free of active bonding agent; and
    a hinged lid configured to open and close with respect to the base and to provide access to product within the container via the frangible region when the hinged lid is open, the hinged lid further including a third field of touch fasteners configured to engage at least one of the first or second touch fastener fields when the hinged lid is closed;
    wherein the first, second, and third touch fastener fields include at least one of hook or loop fastener elements; and
    wherein the first touch fastener field is configured for bonding within an area bounded by the frangible region and is further configured to automatically remove that bounded area upon first opening of the hinged lid, thereby providing a product access port in the flexible sheet material.

17. The container of claim 16 wherein the multi-layer buffer zone has a uniform thickness through its layers.

18. The container of claim 16 wherein a hinging element of the hinged lid is biased to keep the hinged lid in an open position when the third field of touch fasteners is not engaged with the first and second touch fastener fields.

19. The container of claim 16 wherein the first touch fastener field is associated with a first peel strength and the second touch fastener field is associated with a second peel strength that is less than the first peel strength.

20. The container of claim 16 wherein the first touch fastener field and bounded area of the package together effectively form a plug for the product access port when the hinged lid is closed.

21. A container defining an interior volume, the container comprising:
   flexible sheet material bounding at least one side of the interior volume and forming an outer surface of the container, the flexible sheet material having a frangible region to provide access to product within the interior volume; and
   a flexible reusable closure system adhered to the flexible sheet material over the frangible region, the closure system including
      a flexible base configured with adhesive for adhering the flexible base to the flexible sheet material, the flexible base further including first and second fields of touch fasteners separated by a multi-layer buffer zone that is configured to keep the frangible region substantially free of active adhesive, and
      a flexible hinged lid configured to open and close with respect to the flexible base and to provide access to the product via the frangible region when the hinged lid is open, the hinged lid further including a third field of touch fasteners configured to engage at least one of the first or second touch fastener fields when the hinged lid is closed,
      wherein the first, second, and third touch fastener fields include at least one of hook or loop fastener elements, and
      wherein the first touch fastener field is configured to automatically remove the frangible region upon first opening of the closure system, thereby providing a product access port.

22. The container of claim 21 wherein the multi-layer buffer zone includes a first layer that corresponds to a touch fastener layer of the closure system and a second layer that corresponds to a bonding layer of the closure system, the bonding layer comprising at least one of adhesive or a surface to be bonded by physical or chemical action.

23. The container of claim 21 wherein:
   the first touch fastener field is configured for adhering within an area of the flexible sheet material bounded by the frangible region; and
   the first touch fastener field is configured to, along with the bounded area of the flexible sheet material, effectively form a plug for the product access port when the hinged lid is closed.

24. A reusable closure system for packaging applications that include use of a frangible region to provide access to packaged product, the closure system comprising:
   a base configured to be bonded to product packaging material, the base further including first and second fields of touch fasteners separated by a multi-layer buffer zone that is configured to keep the frangible region substantially free of active bonding agent; and
   a hinged lid configured to open and close with respect to the base and to provide access to the packaged product via the frangible region when the hinged lid is open, the hinged lid further including a third field of touch fasteners configured to engage at least one of the first or second touch fastener fields when the hinged lid is closed;
   wherein the first, second, and third touch fastener fields include at least one of hook or loop fastener elements; and
   wherein the multi-layer buffer zone has a first thickness with respect to its layer that corresponds to the first and second touch fastener fields and a second thickness with respect to its layer that corresponds to bonding agent, and the first thickness is thinner than the second thickness.

25. The closure system of claim 24 wherein the hinged lid is integral with the base, such that the hinged lid is materially attached to at least the second touch fastener field.

\* \* \* \* \*